US012649869B2

(12) United States Patent
Luenne

(10) Patent No.: US 12,649,869 B2
(45) Date of Patent: Jun. 9, 2026

(54) METHOD FOR PRODUCING A PRESSURE-SENSITIVE ADHESIVE BASED ON AN ALKOXYLATED, IN PARTICULAR ETHOXYLATED, SILANE-CONTAINING POLYMER, PRESSURE-SENSITIVE ADHESIVE PRODUCED ACCORDING TO THIS METHOD, AND USE THEREOF

(71) Applicant: Coroplast Fritz Müller GmbH & Co. KG, Wuppertal (DE)

(72) Inventor: Mario Luenne, Erkrath (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 1041 days.

(21) Appl. No.: 17/611,994

(22) PCT Filed: May 20, 2020

(86) PCT No.: PCT/EP2020/064052

§ 371 (c)(1),
(2) Date: Nov. 17, 2021

(87) PCT Pub. No.: WO2020/234342

PCT Pub. Date: Nov. 26, 2020

(65) Prior Publication Data

US 2022/0228034 A1      Jul. 21, 2022

(30) Foreign Application Priority Data

May 21, 2019    (EP) ..................................... 19175648

(51) Int. Cl.
*C09J 7/38*          (2018.01)
*C09J 11/08*        (2006.01)
(52) U.S. Cl.
CPC ................. *C09J 7/38* (2018.01); *C09J 11/08* (2013.01); *C09J 2301/302* (2020.08);
(Continued)

(58) Field of Classification Search
CPC ........ C09J 7/38; C09J 11/08; C09J 2301/408;
C09J 2301/302; C09J 2423/00;
(Continued)

(56) References Cited

U.S. PATENT DOCUMENTS

2015/0030848 A1    1/2015  Goubard
2015/0166858 A1*   6/2015  Goubard .............. C08G 18/755
                                                            156/329
2018/0355214 A1*  12/2018  Corstorphine .......... C08L 63/00

FOREIGN PATENT DOCUMENTS

DE        202014104045 U1      9/2014
DE        102016105339 A1 *    9/2017   ......... C08G 18/4825
(Continued)

OTHER PUBLICATIONS

European Patent Office, Rijswijk, Netherlands, International Search Report of International Application No. PCT/EP2020/064052, Mailed Jun. 9, 2020, 2 pages.

(Continued)

*Primary Examiner* — Kelechi C Egwim
(74) *Attorney, Agent, or Firm* — Dickinson Wright PLLC

(57)          ABSTRACT

A method for manufacturing a pressure-sensitive self-adhering adhesive is based on an alkoxylated silane-containing polymer, to which is added at least one tackifying resin compatible with the alkoxylated, silane-containing polymer, and at least one catalyst (K). To overcome various disadvantages of the prior art, such as a too-slow or excessively violent reaction of the alkoxyl groups, and the need for an additional supplying of water, the alkoxylated silane-containing polymer is crosslinked using a catalyst (K) that comprises a Lewis acid-base adduct, wherein the Lewis acid (LS) is a reaction-inhibited cation at least in the temperature range below 60° C., and the Lewis base (LB) is an anion of a very strong acid. In a preferred embodiment the Lewis acid
(Continued)

(LS) is an organyl-group-containing (AG) halogen-onium cation, and the Lewis base (LB) is the anion of a superacid.

26 Claims, 13 Drawing Sheets

(52) U.S. Cl.
CPC ...... *C09J 2301/408* (2020.08); *C09J 2423/00* (2013.01); *C09J 2433/00* (2013.01); *C09J 2467/00* (2013.01); *C09J 2471/00* (2013.01); *C09J 2475/00* (2013.01); *C09J 2493/00* (2013.01)

(58) Field of Classification Search
CPC ... C09J 2433/00; C09J 2467/00; C09J 2471/00; C09J 2475/00; C09J 2493/00
USPC .......................................................... 524/507
See application file for complete search history.

(56) References Cited

FOREIGN PATENT DOCUMENTS

| | | | | |
|---|---|---|---|---|
| EP | 0106330 | A1 | 4/1984 | |
| EP | 295330 | A * | 12/1988 | ........... C09J 133/08 |
| EP | 0295330 | A2 | 12/1988 | |
| EP | 2682444 | A1 | 1/2014 | |
| EP | 3255113 | A1 * | 12/2017 | |
| WO | 2016174469 | A1 | 11/2016 | |
| WO | 2017162690 | A1 | 9/2017 | |

OTHER PUBLICATIONS

Hall, Norris F. et al., "A Study of Superacid Solutions. I. The Use of the Chloranil Electrode in Glacial Acetic Acid and the Strength of Certain Weak Bases," Journal of the American Chemical Society, Dec. 1, 1927, 49, 12, 3047-3061, 24 pages.

Wikipedia, Parts per hundred rubber, Abgerufen von, "https://de.wikipedia.org/w/index.php?title=Parts_per_hundred_rubber&oldid=191542304" Aug. 21, 2019, 1 page.

TEGOPAC Seal 100, High elasticity for low modulus sealants, Evonik Nutrition & Care | TEGOPAC Seal 100 | Aug. 2015, pp. 1/2.

Data Sheet Polymer ST 61 LV, For Low Viscous Wood Floor Adhesives with High Strength and Elasticity, Evonik Hanse GmbH | Polymer ST 61 LV | Oct. 2014, 2 pages.

Data Sheet TEGOPAC Reactive Diluents, For Viscosity Reduction & Non-Staining Adhesive & Sealant Formulations, Evonik Nutrition & Care | TEGOPAC Reactive Diluents, | Sep. 2015, p. 1/2.

Data Sheet Dynasylan AMMO, 3-Aminopropyltrimethoxysilane, Evonik Operations GmbH | Product information Dynasylan AMMO | Aug. 2021, p. 1/3.

Data Sheet Dynasylan VTMO, Vinyltrimethoxysilane, Evonik Industries AG | Product information Dynasylan VTMO | Apr. 2014, 3 pages.

DRT the Best of Nature, Dertophene H 150, Technical Data Sheet / Mar. 12, 2014, 1 page.

TIB Chemicals, TIB KAT 216, BU Catalysts & Process Additives, TIB Chemicals AG, Mannheim, Germany, Issue / Oct. 16, 1 page.

Deuteron UV 1240, UV 1242, UV-Initiatoren für kationische Polymerisation, Deuteron Additives to Your Success, 1 page (English translation not available).

\* cited by examiner

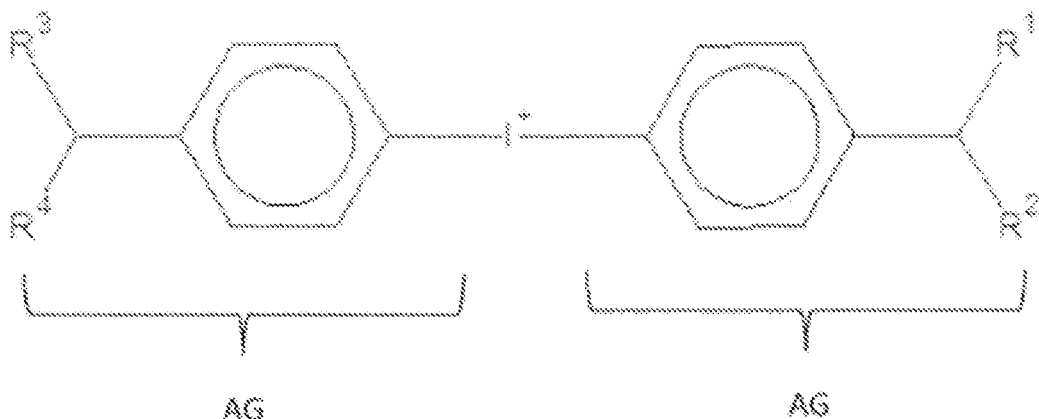
Fig. 3
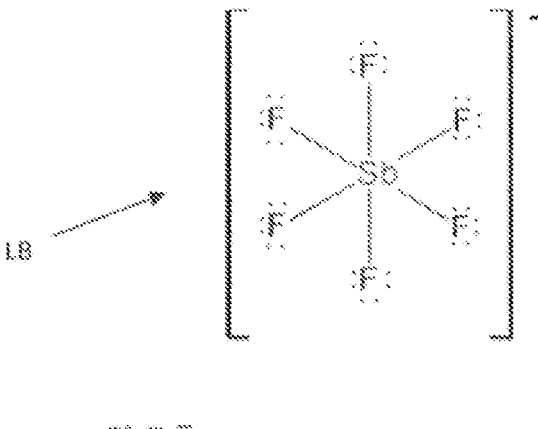
$SbF_6^-$
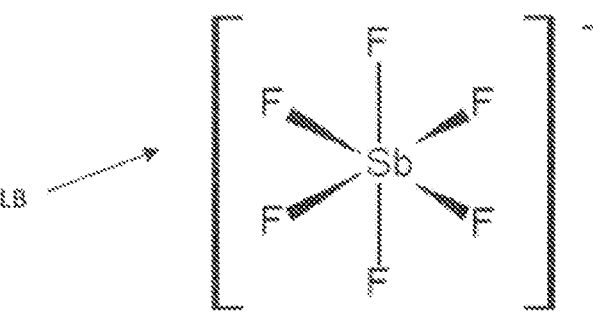
Fig. 4

1. Reaction Step

2. Reaction Step

Fig. 9

Figure 10:
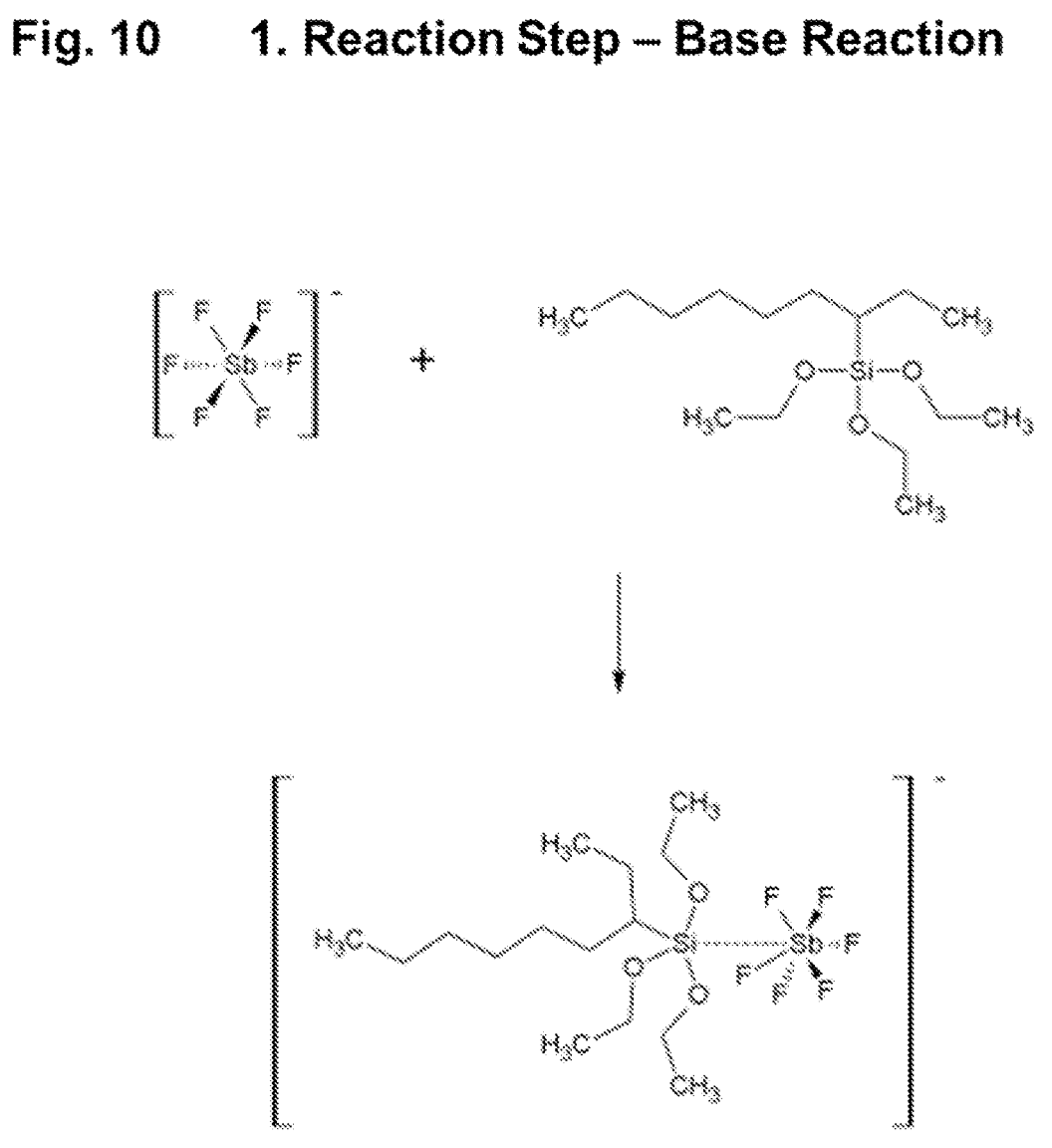

Fig. 10    1. Reaction Step – Base Reaction

Figure 11:
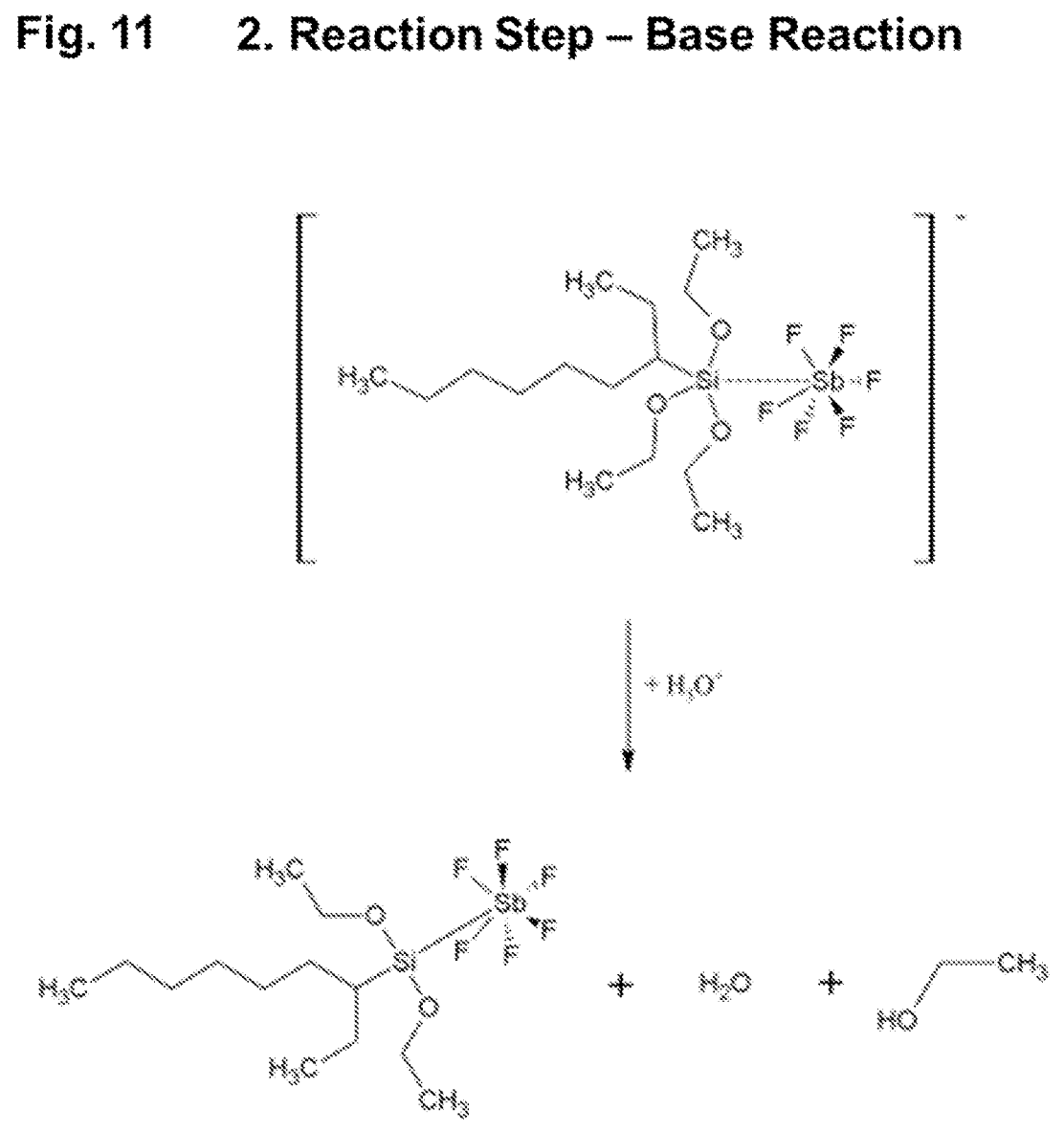

Fig. 11    2. Reaction Step – Base Reaction

Fig. 12    3. Reaction Step – Base Reaction

Fig. 13    4. Reaction Step – Base Reaction

Fig. 14   1. Reaction Step – Acid Reaction
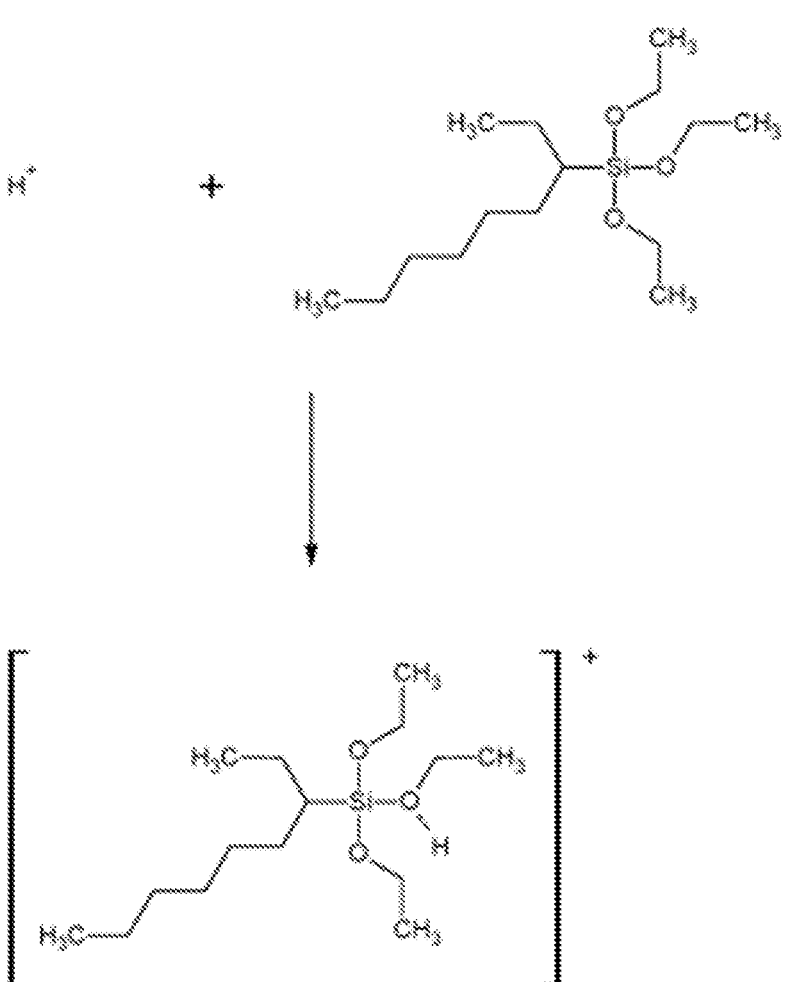

Fig. 15   2. Reaction Step – Acid Reaction

Fig. 16    3. Reaction Step – Acid Reaction

METHOD FOR PRODUCING A PRESSURE-SENSITIVE ADHESIVE BASED ON AN ALKOXYLATED, IN PARTICULAR ETHOXYLATED, SILANE-CONTAINING POLYMER, PRESSURE-SENSITIVE ADHESIVE PRODUCED ACCORDING TO THIS METHOD, AND USE THEREOF

CROSS REFERENCE TO RELATED APPLICATIONS

This application is a 35 U.S.C. § 371 national phase application of International Application No.: PCT/EP2020/064052, filed May 20, 2020, which claims the benefit of priority under 35 U.S.C. § 119 to European Patent Application No.: 2019175648.5, filed May 21, 2019, the contents of which are incorporated herein by reference in their entirety.

FIELD

The present invention relates to a method for manufacturing a pressure-sensitive self-adhering adhesive (PSA—Pressure-Sensitive Adhesive) based on an alkoxylated, in particular ethoxylated, silane-containing polymer, as well as to an adhesive that is manufactured according to this method, and its use.

BACKGROUND

The statements in this section merely provide background information related to the present disclosure and several definitions for terms used in the present disclosure and may not constitute prior art.

Adhesives in use today are usually comprised of rubber- or acrylate-systems that can be applied from various matrices: as aqueous dispersions, as solutions, in organic solvents, or as a 100% system. These adhesives are manufactured primarily from natural or synthetic rubber or from polyacrylates. Rubber adhesives are comprised of polyisoprene, or block copolymers made of styrene and isoprene or butadiene and require a mixing with resins to obtain adhesive properties. In addition, mineral oils are usually added as plasticizer, and/or inorganic fillers or pigments such as chalk, zinc oxide, or titanium dioxide. Acrylate adhesives are usually comprised of a copolymerizate of various esters of the acrylic acid. 2-ethylhexyl acrylate and n-butylacrylate are common in particular. All of these known adhesives each have certain advantages and disadvantages, so there is no universal adhesive.

Solvent-based adhesives (Solvent-Based Pressure-Sensitive Adhesives—SBPSA), in particular acrylates, have many advantages specifically with respect to their adhesive properties, but are, for example, relatively less environmentally friendly, since the solvent must be post-treated or recycled. An alternative to the above-mentioned PSAs are silane-modified polymers (Silane-Modified Polymers—SMP). These substances—also referred to as organofunctional silanes—are hybrid compounds that combine in one molecule the functionality of a reactive organic group with the inorganic functionality of an alkyl silicate. They are used above all in the field of adhesives and sealants. Under the influence of moisture, they form an elastic network, which can also be used as the basis for adhesives for use in labels and adhesive tapes. Thus, in particular during their processing, they can technologically and ecologically fulfill all requirements of modern adhesives and sealants. For this purpose, however—in contrast to the other known bonding adhesive systems—it is necessary as an important adhesive property to ensure a permanent adhesiveness. Advantages here with respect to the rubber-hotmelt PSAs are in the area of an increased temperature- and solvent-resistance. In comparison to the SMP PSAs, solvent-based acrylates are less environmentally friendly, since—as mentioned—the solvent must be post-treated.

In principle, under the influence of moisture and/or heat, alkoxy-silanol groups located in silane-modified prepolymers can be hydrolyzed, and subsequently under condensation form a network. Desired adhesive properties are then obtained by the addition of suitable resin systems, whose use, however, is often limited by a reduced compatibility with the polymer. Formulations based on these polymers are usually crosslinked with the aid of organic tin- or titanium-compounds as catalysts or starters or initiators, wherein these substances—in contrast to the understanding of a catalyst in the narrower sense—can possibly also enter into the reaction product. Examples of such compounds are dioctyltin dilaurate (known commercially, for example, as TIB-KAT® 216 from the company TIB Chemicals AG), or 2-ethylhexyltitanate (also known as Tyzor® TOT from the company Dorf Ketal Specialty Catalysts LLC). In the literature aluminum compounds are also described in part as catalysts.

In the 1980s, the technology of manufacturing and processing of the so-called MS polymers (Modified by Silane—MS) was described in particular by the company Kaneka (e.g., EP 0 295 330 A2 and EP 0 106 330 B1). Thus, EP 0 295 330 A2 mentions an acrylic adhesive, comprising (A) 100 parts by weight of acrylic polymer, comprising units that are derived from an alkyl acrylate whose alkyl group includes 2 to 14 carbon atoms, and (B) 1 to 30 parts by weight of polyether including at least one silicon-containing cross-linkable group in a molecule, wherein the silicon-containing cross-linkable group is cross-linkable into an elastomer under formation of a siloxane bond. In the examples, formulations are also mentioned that also contain an adhesion-promoting resin ('tackifier resin'). In the course of further development of this technology, further patent applications have been published in recent years that relate to various variations of the formulation in the polymer chain. Thus, for example, polyurethane (PUR) has been inserted into the polymer chain, or polyether monomer units have been exchanged for polyurethane units. By mixing with compatible adhesion-promoting resins (tackifiers), adhesives can be produced that achieve the adhesive properties of SBPSAs. There are simultaneously advantages here with respect to the rubber-hotmelts in the area of increased temperature- and solvent-resistance.

An adhesive based on a silane-modified polymer, and a corresponding adhesive product, in particular an adhesive tape, is known from DE 20 2014 104 045 U1. This technical adhesive tape is suitable for, in particular, applications in the construction field, and includes a band-shaped carrier as well as a pressure-sensitive and cross-linkable adhesive coating applied to at least one side of the carrier, which adhesive coating has a specific surface weight of greater than 100 $g/m^2$. The adhesive coating is initially comprised of the following components: a) 20 wt.-% to 85 wt.-% of a polyurethane or polyether; b) 15 wt.-% to 85 wt.-% of an adhesive resin compatible with the component a), and c) 0.01 wt.-% to 3 wt.-% of a crosslinking agent. Here, the adhesive coating shall in particular preferably be formed as heat-cross-linkable. Under this aspect it has proven favorable, when the used polyurethane or polyether also contains silane. In the specific composition, such a component of the type of a hydrolysable alkoxysilane generally includes two terminal silane-containing groups.

US 2015/0030848 A1 describes a method for manufacturing a breathable self-adhesive product. Broadly, this patent claims the manufacture of this self-adhesive product using an adhesive formulation that contains a) at least one silyl-containing polymer, b) at least one compatible adhesion-promoting resin, and c) at least one catalyst. Here the weight percentages of the individual components are preferably apportioned as follows: a) 20 wt.-% to 85 wt.-%, b) 15 wt.-% to 80 wt.-%, and c) 0.01 wt.-% to 3 wt.-%. The silyl-containing polymer is comprised of polyurethane or polyether or is a copolymerizate made of polyurethane- and polyether-blocks. Phenol-modified terpene resins, hydrocarbon resins, rosin ester resins, acrylic resins, and their mixtures are referred to as suitable adhesion-promoting resins.

However, it should be stated that in many cases adhesives of the above-described type that are manufactured from silane-crosslinking, in particular alkoxysilane-terminated, prepolymers fall short of the adhesive technology requirements that are readily fulfilled by commercially common adhesives, that are manufactured, for example, on the basis of polyacrylates precipitated from a solvent matrix.

A further problem consists in that toxic methanol is also split off during the crosslinking during the manufacture of the above-described adhesives, which are generally manufactured from methoxy-silane prepolymers. The methanol appears in the exhaust of the process and must either be treated or brought below the critical MWC value of 270 $mg/m^3$ air over 8 hours (MWC=guideline for the maximum workplace concentration) or below the VOC value permitted in Germany of 20 $mg/m^3$ for methanol (VOC—Volatile Organic Compounds). With an average release of 0.6 mass-% methanol and an application weight of 100 g of adhesive per square meter ($m^2$), which is typical of adhesive tapes, 300 $mg/m^2$ methanol is released in the coating process when a formulation having 50 mass-% resin proportion is assumed. A filtration or corresponding dilution of the exhaust using a sensor system required for this purpose is therefore indispensable. Finally, the lower explosion limit of methanol in air rests at 6 vol.-%, which is why a concentration monitoring is also required for safety reasons, and an accumulation of methanol in the air is to be avoided.

In order to provide a method for manufacturing an adhesive based on a silane-modified polymer, by which method an accumulation of methanol in the air is minimized and wherein the adhesive and an adhesive product of the above-mentioned type also fulfills high adhesive-technology requirements, and wherein in particular the adhesive properties of SBPSA are to be achieved, DE 10 2016 105 339 A1 or WO 2017/162690 A1 provides that the adhesive—using a catalyst—is manufactured from a mixture of chain-shaped, silane-modified alkoxy-silane prepolymers, wherein the mixture contains at least one first, silane-modified, ethoxy-silane prepolymer situated laterally on the chain, and at least one second silane-modified ethoxy-silane and/or methoxy-silane prepolymer situated terminally or laterally on the chain, wherein the first prepolymer and the second prepolymer are crosslinked with each other under separation of alcohol. Insofar as an ethoxy-silane prepolymer is used in this method, it is a method according to the above-described type. The separated alcohol is then ethanol. It is also mentioned that for controlling the crosslinking speed it is necessary to use catalysts in quantities of 0.05 ma.-%-0.3 ma.-% based on the total formulation. Here metal catalysts containing in particular tin-, titanium-, or zirconium-compounds, such as, for example, the tin-containing catalyst Tyzor TPT from the company DuPont, or Tyzor NPZ from the same company, which contains tetraalkyl zirconate, or Tyzor AA75, which contains titanium acetylacetonate (also from DuPont) are used. Organic acids or esters such as butyl phosphate or so-called cooking acids (tertiary saturated monocarboxylic acids) as well as heterocyclic components such as Lupragen N 700 (1,8 diazabicyclo-5,4,0-undecene-7) are considered.

EP 2 682 444 A1 relates to the use of a pressure-sensitive adhesive compound for adhesion in a damp environment. An adhesive composition is mentioned, comprising a) at least one silyl-containing polyether, a silyl-containing polyurethane, in particular a silyl-containing polyurethane including polyurethane-polyether- and polyurethane-polyester blocks, and mixtures thereof, b) at least one compatible adhesion-promoting resin, such as a phenol-modified terpene resin, hydrocarbon resin, colophonium ester resin, acrylic resin, and mixtures thereof, and comprising c) at least one catalyst. As also in the above-mentioned DE 10 2016 105 339 A1 or in WO 2017/162690 A1—Tyzor AA75 (Titanium acetylacetonate) is mentioned as such a catalyst. Aluminum chelate (K-KAT® 5218 from the company King Industries) as well as amine are mentioned as catalysts for a silanol condensation.

A technical-economic challenge here is represented in that, during the manufacturing and in-situ processing of the mentioned polymers on a coating system for manufacturing adhesive tapes, a high crosslinking speed is required, since for a sufficient economic efficiency of the coating process high path speeds are to be driven, and thus the adhesive must already have a sufficiently high degree of crosslinking after a very short time in a device used for activating the crosslinking, such as an oven or a UV radiation device. This also applies in particular to greater layer thicknesses.

Here methoxy-silane prepolymer systems offer a relatively fast crosslinking possibility using the above-mentioned tin- or titanium-catalysts. However, this can prove problematic during the application, since with too-high reaction speed the crosslinking can already occur during the coating, in particular under certain circumstances even already in the coating head. It is necessary to avoid this, since otherwise disadvantageous clump-shaped quality-reducing mass regions could occur in the adhesive layer, or production-inhibiting encrustations could arise on the coating head. However, with increasing proportion of ethoxy-silane prepolymers in the reaction systems it has been shown that the catalyst suffers an efficiency loss and no longer suffices to allow the crosslinking to completely occur before the end of a provided treatment phase in the oven. An increased degree of moisture in the oven is also necessary here for achieving a completeness of the crosslinking.

Furthermore, in terms of production-technology, the implementation of a two- or multiple-component system, such as is the mixture of chain-shaped, silane-modified, alkoxy-silane prepolymers known from DE 10 2016 105 339 A1, as well as a supplying of moisture in current ovens is possible only with great effort. For this reason, a possibility for a quick crosslinking using a one-component system as well as without the additional introducing of moisture during the crosslinking process is sought and desired. On the other hand, for two- or multi-component systems, for the above-mentioned reasons (encrusting in the coating head, inhomogeneities in the layer) an excessive crosslinking speed is undesirable.

SUMMARY

An objective of the present disclosure is to provide a method of the above-mentioned type for manufacturing of a pressure-sensitive self-adhering adhesive based on an alkoxylated, in particular ethoxylated, silane-containing polymer, which is mixed with at least one adhesion-promoting resin, compatible with the alkoxylated, silane-containing polymer, and at least one catalyst K; the method remedies the above-mentioned problems by ensuring a controllable or adjustable reaction speed of the crosslinking.

The problem underlying the invention is solved by the alkoxylated silane-containing polymer being cross-linked using a catalyst that comprises a Lewis acid-base adduct, wherein the Lewis acid is a reaction-inhibited cation at least in the temperature range below 60° C. in anhydrous medium, and the Lewis base is an anion of a very strong acid.

Here the mentioned reaction inhibition can extend up to a range of up to 80° C. and even up to 110° C., and can preferably be caused by a steric hindrance of the cation.

An adhesive manufactured in this manner can be used in particular for manufacturing an adhesive product, such as an adhesive tape or a label, wherein the adhesive product comprises a carrier on which the adhesive is applied at least on one side in the form of an adhesive mass.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 3 shows a chemical structural formula of a group of organyl-group-containing halogen-onium cations preferably usable as Lewis acids in the catalyst in the context of the present disclosure, FIG. 4 shows, in different types of representation, the structure of the Lewis base of the catalyst depicted in FIGS. 1 and 2.

FIG. 5 shows two schematic basic chemical equations for performing the inventive method using an ethoxylated silane-containing polymer, FIG. 6 shows a schematic basic chemical equation for performing a pre-step of the inventive method for forming a urethane-group-containing alkoxylated silane-containing prepolymer, FIGS. 8 and 9 show two chemical equations for describing a first and a second reaction step for activating the catalyst used in the inventive method, FIGS. 10 to 13 each show reaction steps, each described by chemical equations, for hydrolytic decomposition of an alkylated silane-containing polymer in a partial step of the inventive method (base reaction), FIGS. 14 to 16 show three further reaction steps, each described by chemical equations, for hydrolytic decomposition of an alkylated silane-containing polymer in a partial step of the inventive method (acid reaction)

Figures 1, 2:
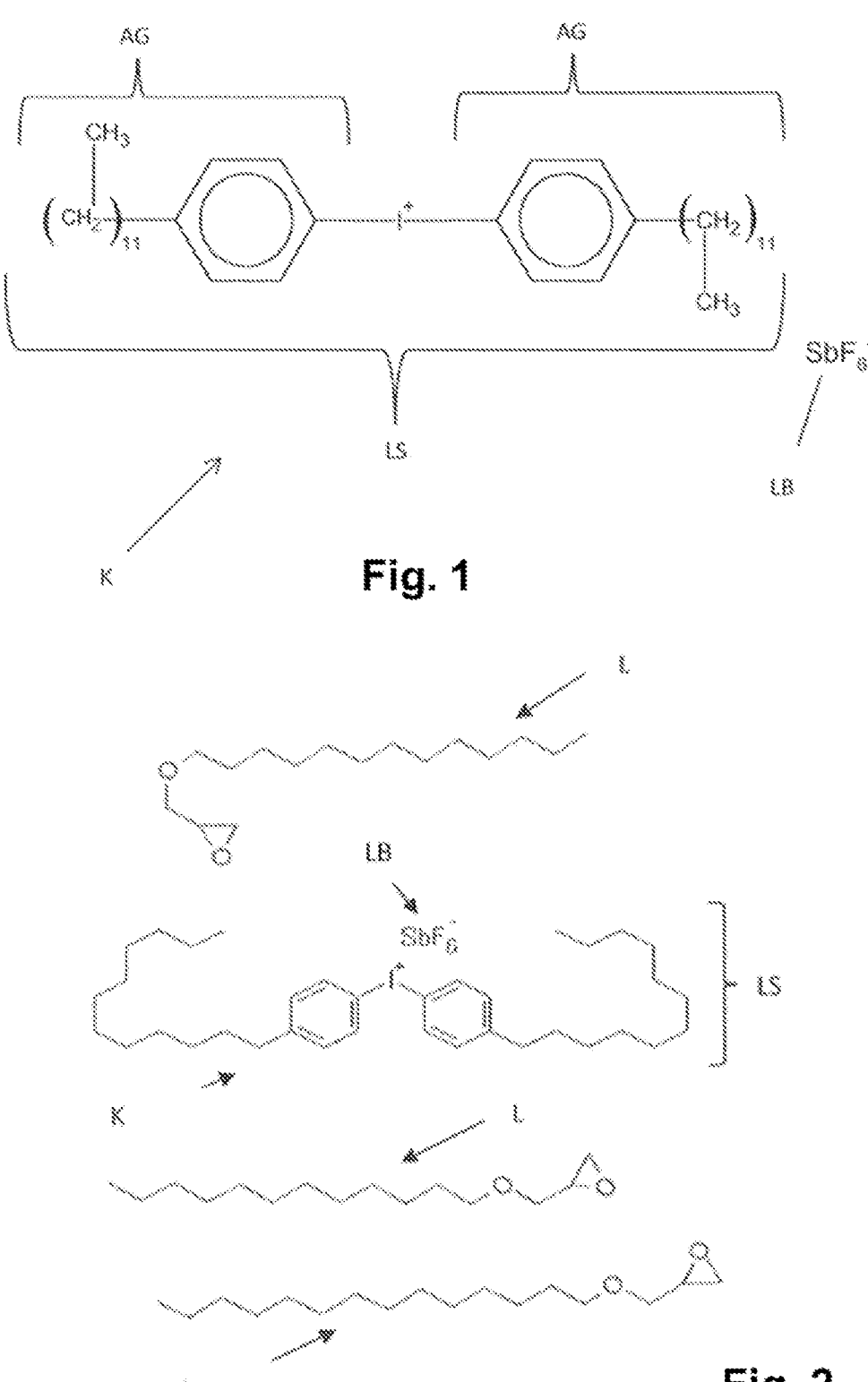
FIG. 1 shows a chemical structural formula of a catalyst preferably usable in the context of the present disclosure.
FIG. 2 shows a schematic structural formula of the catalyst depicted in FIG. 1, including a preferably usable solvent.

In the different Figures of the drawings, identical parts are always provided with the same reference numbers, so that as a rule they are also only described once. Here it is expressly emphasized for the subsequent description that the invention is not limited to the selected exemplary embodiment, and also here not to all or a plurality of features of described feature combinations, but rather each individual partial feature of the exemplary embodiment can also have an inventive significance removed from all other partial features described in connection therewith. The Figures are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

An objective of the disclosure is to provide a method of the above-mentioned type for manufacturing of a pressure-sensitive self-adhering adhesive based on an alkoxylated, in particular ethoxylated, silane-containing polymer, which is mixed with at least one adhesion-promoting resin, compatible with the alkoxylated, silane-containing polymer, and at least one catalyst K; the method remedies the above-mentioned problems by ensuring a controllable or adjustable reaction speed of the crosslinking.

The problem underlying the invention is solved by the alkoxylated silane-containing polymer being cross-linked using a catalyst that comprises a Lewis acid-base adduct, wherein the Lewis acid is a reaction-inhibited cation at least in the temperature range below 60° C. in anhydrous medium, and the Lewis base is an anion of a very strong acid.

Here the mentioned reaction inhibition can extend up to a range of up to 80° C. and even up to 110° C., and can preferably be caused by a steric hindrance of the cation.

An adhesive manufactured in this manner can be used in particular for manufacturing an adhesive product, such as an adhesive tape or a label, wherein the adhesive product comprises a carrier on which the adhesive is applied at least on one side in the form of an adhesive mass.

In a preferred manner the present disclosure provides that the Lewis acid is an organyl-group-containing halogen onium cation. In a preferred manner the Lewis base can be the anion of a superacid.

The Lewis acid-base concept is, as is known, a definition of the terms acid and base that extends beyond the previous Brønstedt classification, according to which acids are proton donors and bases are proton acceptors. This more comprehensive definition was introduced in 1923 by Gilbert Newton Lewis. Accordingly a Lewis acid is an electrophilic electron-pair acceptor, and can thus accumulate electron pairs, while a Lewis base is accordingly a nucleophilic electron-pair donor that can provide electron pairs.

In the narrower sense an onium compound (also onium ion) is understood to mean a cation, which has been technically caused by protonation of the hydride of a pnictogen (group 15 in the periodic system—nitrogen group), a chalcogen (group 16) or a halogen (group 17). However, there are also onium ions of the boron group (group 13), the carbon group (group 14), of hydrogen, and of the noble gases (group 18). The longest known onium ion, from which the name of the onium compound group has also been derived, is ammonium, $NH_4^+$, which is known to arise from ammonia $NH_3$ by protonation. However, according to the application the term onium is used here in the broader sense, according to which cations are thus also referred to that result by substitution of one or more hydrogen atoms by another group, wherein a di- or trivalence can also be present. An onium cation is able to act as electron-pair acceptor and is therefore a Lewis acid. An organyl-group-containing halogen onium ion is—in contrast to a negatively charged halide ion without coordination groups—a positively charged particle. Here the organyl-group-containing halogen onium ion can preferably be a diaryl with divalent bonding, i.e., the chemical bond of two, in particular similarly formed aromatic organic residues of the protonated halogen. Three or more aryl groups can also be contained in the organyl-group-containing halogen onium ion.

WO 2016/174469 A1 mentions that an initiator and/or a catalyst component for producing a curable two-component adhesive composition can be an iodonium salt, selected from (4-n-Octyloxyphenyl)phenyliodonium hexafluorantimonate (OPPI SbF6), (4-n-Decyloxyphenyl)phenyliodonium hexafluorphosphate (DOPI PF6), Di(t-Butylphenyl) iodonium hexafluorarsenate (DTBPI AsF6) and (4-Methylphenyl)-(4-isopropylphenyl) iodonium tetrakis pentafluorphenyl borate (Rhodorsil 2074). The composition comprises: (A) an adhesive component, comprising (i) an aliphatic glycidyl ether, (ii) a cycloaliphatic epoxy and/or an aromatic glycidyl ether, and (iii) a silane reduction agent; as well as (B) a catalyst component, comprising (iv) a noble metal catalyst of group 9 or of group 10, wherein the adhesive component (A) and/or the catalyst component (B) further comprise an initiator. With regard to the mentioned silane reducing agent ("silane reducing agent"), it is chemically seen as a Si—H compound, i.e., something other than a silane-modified polymer. Si—OR groups—with R as a component containing a carbon atom, are not present there. The epoxidic components claimed in WO 2016/174469 A1 and described in the context of the examples are also not comparable to silane-modified polymers, so that it is not obvious to inventively use the initiators/catalysts that are known and selective for epoxide resins.

In chemistry, acids referred to as very strong acids have $pK_a$ values of less than −0.35. The $pK_a$ value, which—like the pH value—is a dimensionless number and can be taken from tabular values, indicates here to what extent an acid is present protolyzed in the equilibrium reaction with water. It results as the decadic logarithm of the hydrogen-ion activity. The smaller this value is, the stronger the acid is. For example, the $pK_a$ value of nitric acid is −1.32, that of sulfuric acid is −3, that of hydrochloric acid is −6, and that of hydrogen iodide is −10. Acid residues—i.e., the anions of the acids—can occur as electron-pair donors; they are thus Lewis bases. According to one aspect of the present disclosure, the anions at least of a Brønstedt acid, which is also always a Lewis base, having a $pK_a$ value of ≤−3.0, are preferred for use as Lewis bases. However, it is also possible according to the present disclosure that the Lewis bases and/or Lewis acids are not Brønstedt bases or Brønstedt acids.

In chemistry, acids are referred to as superacids that are stronger than concentrated sulfuric acid (see, for example, F. Hall, J. B. Conant: "A Study of superacid solutions. I. The use of chloranil in glacial acetic acid and the strength of certain weak bases," in: J. Am. Chem. Soc. 1927, 49, 3047-3061). However, since it cannot be demonstrated in an aqueous environment that a superacid is stronger than concentrated sulfuric acid, to quantify the acid strength of superacids the Hammett acidity function $H_0$ is used (see, for example, L. P. Hammett, A. J. Deyrup: "A series of simple basic indicators. I. The acidity functions of mixtures of sulfuric acid and perchloric acids with water," in: J. Am. Chem. Soc. 1932, 54, 2721-2739). The $H_0$ value of concentrated sulfuric acid is −11.93. Accordingly, superacids have an $H_0$ value of <−12. For example, hexafluoroantimonic acid has an $H_0$ value in the range of −21 to −23. In the sense of the Brønstedt definition, the anion ($SbF_6^-$), resulting therefrom is only weakly nucleophilic, i.e., weakly basic, but in the HSAB concept (English: Hard and Soft Acids and Bases) used on Lewis acids and bases—also referred to as the Pearson concept after its creator—a so-called hard base, i.e., a hardly polarizable, but strongly polarizing particle having high charge density. A similar situation also applies, for example, for trifluoromethanesulfonic acid $CF_3SO_3H$, whose acid residues are triflate anions. Hard, soft, and medium Lewis acids and -bases according to the HSAB concept can be seen in respective tables.

According to one aspect of the present disclosure, it is preferred that the superacid has an $H_0$ value according to the Hammett acidity function in the range of −14 to −30, preferably in the range of −20 to −27.

EP 3 255 113 A1 relates to a method for manufacturing an adhesive—and/or sealant composition. Here this document is devoted in particular to the development of a method, using which the adhesive value of the manufactured adhesive—and/or sealant composition is adjustable over a wide range, and which makes possible the achieving of very high adhesive values. In addition, this document aims for a more economical and practicable method for manufacturing the adhesive—and/or sealant composition with a high enough adhesiveness, without special equipment or the use of special organic compounds or heat-activatable rheology controllers being required. The document mentions mixtures containing silane-modified polymers, such as Tegopac and Geniosil, as well as the use of catalysts such as tin or a Lewis acid component, wherein in this respect the transition metals zirconium, hafnium, zinc, boron, aluminum, and bismuth are addressed in this respect. In accordance with the above-mentioned objective of avoiding the use of heat-activatable rheology controllers, no inhibition of the Lewis components is provided here.

In contrast thereto, regarding the inventive inhibition of the cation reaction, in addition to or together with the already mentioned steric hindering—this factor can also be effected by inhibiting of the decomposition of the Lewis acid-base adduct, in particular by inhibiting of its dissociation. For this purpose the principle of the use of protective groups is also applicable. Here "protective groups" are understood to mean substitutes that are introduced into a molecule in order to temporarily protect a certain functional group, and thus to prevent an undesired reaction on this group. For example, after carrying out of a desired reaction at another position of the molecule, when a reaction is to be set into motion on the protected functional group, the protective group is split off again. For many functional groups, a plurality of possible protective groups are known that differ in their stability and the conditions for their splitting. Thus, in particular the Lewis acid can contain at least one protective group.

The property of steric hindrance refers to an inhibiting influence of the spatial extension and/or form of the ion on a reaction process. If large and space-filling groups are located in the environment of the reactants—as in the inventive case preferably organyl groups instead of hydrogen—some reactions occur only very slowly, or they do not occur at all when the sterically inhibiting groups are correspondingly long. The reason for this is that the transition state of the reaction is at an increased energy level since the "bulky" organyl groups move very close to one another and an electrostatic repulsion of the electron shells results. Thermodynamically a higher activation energy is thus required for a reaction to occur, which is less under reaction conditions without steric (or other) hindrance, whereby an activation can be achieved very quickly.

A kinetic inhibition of the transformation of the impeded reactants is associated with the increased activation energy. If the reaction occurs, it is retarded by this hindering or impeding factor. Using the chain length and the chemical nature of the sterically inhibiting organyl groups, in particular by a suitable combination of aromatic and aliphatic group components, a "tailor-made" activation energy and reaction kinetics of the crosslinking can thus advantageously be attained.

Here the present disclosure is based on the idea of using a catalyst that is only effective after activation, wherein in particular the initiating of a cationic starting mechanism makes possible a reduction of the pH value. Here due to the inventive catalyst a low hydrolysis speed, according to the prior art—compared to methanol residues—of the ethanol residues contained in an ethoxylated silane-containing polymer can be accelerated. Generally speaking, in particular the hydrolysis speed can be controlled, in particular accelerated, depending on the constitution and linking of the alkoxy residue in the molecule.

In the Lewis acid-base adduct inventively used as crosslinking catalyst, there is in particular an ionic bond, which in particular in the adduct is a neutrally reacting complex salt. However, in anhydrous, polar, organic solvents, such as in particular in a glycid ether or in propylene carbonate, the constituents of the adduct can easily dissociate, wherein a stabilization of the dissolved particles in the solution takes place by solvation. In a synergistic manner the adduct constituents can thereby appear as co-catalysts and are thus superior to the known catalysts used for the crosslinking.

In any case it has been found that according to the present disclosure, non-methoxylated, but advantageously also ethoxy-silane prepolymers can be catalyzed with the highest efficiency in the reaction systems used for the crosslinking. It is thus possible to allow the desired crosslinking to occur completely with a high operating speed through an oven within a short drying phase that is heretofore only characteristic for methoxylated prepolymers, i.e., with a sufficient degree of crosslinking.

From a formal point of view a molecule of water is required for each Si—O—Si bond in the hydrolysis, so that residues of each two Si—O—R can be split off as R—OH. But surprisingly, according to the present disclosure no significant additional supplying of moisture in the oven is necessary here, since under the hydrolytic effect of the catalyst on the alkyl groups the ambient humidity is sufficient for initiating the reaction, wherein water arising in the reaction—retroactively—can also have a hydrolytic effect.

In the context of the present disclosure it is advantageously possible that the alkoxylated silane-containing prepolymers to be crosslinked—together with the other starting materials—are present as a one-component system.

However—as is known—in a two- or multi-component system, the adhesive can also be manufactured from two mixtures of chain-shaped silane-modified alkoxy-silane polymers or prepolymers, which are preferably only brought together directly before the crosslinking reaction.

The system to be crosslinked can contain at least a first, silane-modified ethoxy-silane prepolymer in particular laterally situated on the chain, and at least one second silane-modified ethoxy-silane and/or methoxy-silane prepolymer terminally and/or laterally situated on the chain. Here the first prepolymer and the second prepolymer are crosslinked to each other by the separating of alcohol, such as methanol and/or ethanol, i.e., in the course of a condensation reaction. The first ethoxy-silane prepolymer, silane-modified and laterally positioned on the chain, can preferably be a longer-chain prepolymer than the second shorter-chain ethoxy-silane and/or methoxy-silane prepolymer positioned terminally and/or laterally on the chain, wherein the degree of polymerization of the second polymer is less than the degree of polymerization of the first prepolymer, and wherein the degree of polymerization differs in particular by at least two powers of ten.

Here in the sense of a minimized methanol release during the crosslinking the present disclosure provides in particular that a total proportion of silane-modified methoxy-silane prepolymers in the mixture of the chain-shaped silane-modified alkoxy-silane prepolymers is at most 50 ma.-%. It is of particular advantage when a proportion of longer-chain alkoxy-silane prepolymers in terminal position is less than 15 ma.-% of the total of the masses of prepolymers, resin, catalyst and optionally present further ingredients.

The ethoxylated silane-containing polymer or the first prepolymer and/or the second prepolymer of the mixture can contain as functional groups amino-, glycidoxy-, sulfuric-, and/or methacryloxy-groups in the molecule that are bound in the γ-position via a propylene bridge or preferably in the α-position via a methylene group to at least one silicon atom of the ethoxy-silane and/or methoxy-silane prepolymer. In order to compensate for the reaction resistance of a laterally substituted first prepolymer, the so-called α-effect can thus be used in particular.

Here the α-effect is understood to mean the following: Known organo-functional silanes are usually trialkoxy-silanes including a propylene bridge between the Si atom and a further functional group X bonded to it. As mentioned above—amino-, glycidoxy-, sulfuric-, and methacryloxy-groups are of significance as functional groups X. An extremely increased reactivity of the Si-alkoxy groups is achieved by a replacement of the propylene bridge by a shorter methylene bridge. This results from an electronic interaction of the functional group X with the Si-atom, which is only observed in this α-position, which is why it is referred to as the so-called α-effect and α-chemistry. For example, the neighborhood of an electronegative donor, such as nitrogen or oxygen in the α-position with respect to the silicon atom, i.e., only separated therefrom by a methylene bridge, activates the alkoxy functions on the silicon atom. These are thus more reactive with respect to nucleophiles. With the entering of water, this means that they hydrolyze more quickly.

In contrast to standard silanes, well established in the prior art, having propylene spacers (γ-silanes), in the α-silanes the dialkoxysilanes also represent, in addition to the trialkoxysilanes, important components of the polymers to be synthesized. In the crosslinking a targeted setting of the crosslinking density can be effected, for example, by the use of difunctional silanes.

In addition—with the use of the inventive catalyst in a synergistically interacting manner—the α-effect also leads to a lower reactivity difference between methoxy- and ethoxy-silyl groups. It is thus even more possible to replace methoxysilanes by ethoxysilanes, without simultaneously worsening the application properties and lengthening the manufacturing time, wherein the release of methanol occurring during condensation is minimized. Here—as already mentioned—at the same time there are advantages with respect to the rubber-hotmelts in the area of increased temperature- and solvent-resistance.

The inventively produced SMP adhesive combines high adhesive forces with high shear strengths, and thus fulfills high adhesive-technology requirements that are in the same range as are known from the adhesive properties of SBPSA. The adhesive forces obtained here with the inventively manufactured adhesives confirm a high adhesion on various substrates, in particular—as compared to the adhesives that are manufactured using the known catalysts—also an improved adhesion on lower-energy surfaces, for example comprised of polyolefins. In combination with these high adhesive forces, high shear strengths are advantageously also achieved, which at 70° C. are greater than 10000 min. This documents that the intermolecular connections arising during the crosslinking in the inventive adhesive lead to a dense network having a correspondingly high internal strength.

A mass proportion of the catalyst—with respect to the total of the masses of the alkoxylated silane-containing polymer, or the mixture of prepolymers and the masses of the resin, of the catalyst and optionally present further ingredients, can decrease in the range of 0.2% to 10.0%, preferably in the range of 0.6% to 5.0%.

The invention is explained in greater detail below using an example with reference to the accompanying drawings.

In the embodiment of the invention explained below, by way of example an inventively preferred adhesive formula (mixture 2, reference number M2 in FIG. 7) is presented, which is differentiated from the known formulas in particular by the nature of the catalyst. This formula is compared to a comparison formula (mixture 1, reference number M1 in FIG. 7), wherein the starting materials mentioned in the following Table 1 have been used as starting materials.

TABLE 1

| Adhesive formulas (specifications in ma.-%) Formulas (specifications in mass-percentage) | | | |
|---|---|---|---|
| Function | Starting material | M1 Comparison | M2 Invention |
| Polymers | Tegopac Seal 100 | 24.29 | 24.17 |
| | Polymer ST 61 LV | 12.10 | 12.03 |
| Reactive diluent | Tegopac RD 1 | 12.10 | 12.03 |
| Liquid additives | Dynasylan AMMO | 1.05 | 1.04 |
| | Dynasylan VTMO | 1.99 | 1.98 |
| Resin | Dertophene H150 | 48.23 | 47.99 |
| Catalysts | TIB-KAT ® 216 | 0.25 | 0.00 |
| | Deuteron UV 1242 | 0.00 | 0.75 |
| Total | | 100.00 | 100.00 |

As an aid in comprehension, in Table 1 a the same formulas are specified again in phr (parts per hundred rubber), wherein the normalizing "100 parts rubber" is formed by the amount of the first prepolymer (Tegopac Seal 100).

TABLE 1a

| Adhesive formulas (specifications in phr) Formulas (specifications in phr) | | | |
|---|---|---|---|
| Function | Starting material | M1 Comparison | M2 Invention |
| Polymers | Tegopac Seal 100 | 100.0 | 100.0 |
| | Polymer ST 61 LV | 49.8 | 49.8 |
| Reactive diluent | Tegopac RD 1 | 49.8 | 49.8 |
| Liquid additives | Dynasylan AMMO | 4.3 | 4.3 |
| | Dynasylan VTMO | 8.2 | 8.2 |
| Resin | Dertophene H150 | 198.6 | 198.6 |
| Catalysts | TIB-KAT ® 216 | 1.0 | 0.00 |
| | Deuteron UV 1242 | 0.00 | 3.1 |
| Total | | 411.7 | 413.7 |

It is clear from this that the formula components—apart from the catalysts, whose effect is to be compared—are present in identical portions with respect to the main polymer.

Tegopac Seal 100 (supplier: Evonik) is a terminal laterally ethoxy-silane polypropylene glycol that has been used as a first prepolymer in the mixtures. Tegopac Seal 100 is a prepolymer, wherein alkoxy-functional silane groups, in particular ethoxy groups, are not incorporated terminally into the framework of the polymer, but rather disposed in a targeted manner distributed laterally over the chain of the molecular base framework, wherein, however, these lateral alkoxy functional silane groups are located in particular on the ends of the chains. Using the crosslinking units incorporated as distributed over the molecular chain length, important properties, such as the crosslinking density, can be controlled. In addition to the advantage of the ethanol splitting off, Tegopac Seal 100 has the property that due to the lateral chain substitution an easier three-dimensional crosslinking can occur, which leads to a very dense network and therefore to a high shear strength. It has a kinematic viscosity of 55 Pas at 23° C. Tegopac Seal 100 has a chain length in the range of 12 K to 18 K, on average 15 K, wherein 1 K corresponds to a chain length having a molar mass of 1000 g/mol.

Here the sum of the molar mass of the main chain and—if present—of all side chains is to be seen as a total chain length that corresponds to the respective molar mass. Thus at least one of the two prepolymers, or both prepolymers, can also be comprised of branched or unbranched chain molecules, wherein the terminal and/or lateral silane modification in a branched molecule can be present in a side chain and/or on the main chain.

As is common with polymers, the molar masses (synonyms: molecular mass, molar mass) specified in accordance with the application are an average molar mass. Here there is a distinction between $M_n$ (numerical average), $M_w$ (weight average), and $M_z$ (centrifuge average). Here it is always true that $M_n < M_w < M_z$. Ultimately, this distinction is only based on various statistical methods to describe the distribution of the molar mass. These values are identical only in the theoretical case that all molecules actually have the same molecular mass and there is no distribution. The specifications contained in the brochures of the various manufacturers are usually the numerical average $M_n$, which is the most common indication for characterizing such an average value. Here by quotient formation $M_w/M_n$ the so-called polydispersity D can be calculated, which is a measure for the width of the molecular mass distribution. The type and width of the molecular mass distribution are not of significance for the invention, since for technical reasons they are always set in a similar form in the manufacturing method.

The molar mass can be determined, for example, according to the standard DIN EN ISO 16014-5:2012-10 Plastics— Determination of average molecular weight and molecular weight distribution of polymers using size-exclusion chromatography—Part 5: Light-scattering method (ISO 16014-5:2012); German version EN ISO 16014-5; 2012. The standard establishes a general method for determining the average molecular mass and the molecular mass distribution of polymers by GPC-LS, i.e., gel permeation chromatography (GPC), coupled with measurement by light scattering (LS). The average molecular mass and the molecular mass distribution are calculated from the data for the molecular mass and the mass concentrations that are continuously determined with the elution time. With each elution time the molecular mass is determined as an absolute value by a detector for the light scattering being combined with a concentration detector. GPC-LS is therefore classified as an absolute method.

A further method to determine the molar mass is described in DIN EN ISO 4629-2:2016-12 Binders for paints and varnishes—determination of a hydroxyl value— Part 2: Titrimetric method using a catalyst (ISO 4629-2: 2016); German version EN ISO 4629-2:2016. The hydroxyl value (OHZ) is a measure for the content of hydroxyl groups in organic materials, for example, in resins, varnishes, polyesterols, greases, and solvents. With a known molecular structure the molar mass can be calculated from the hydroxyl number. There are a plurality of different standardized methods for determining the hydroxyl number of resins. The classical method using pyridine without catalyst is defined in ISO 4629-1. The advantages of the method using catalyst are the following: the solvents used are less harmful to health; the solvent consumption is lower; the method is faster due to shorter reaction times; the transition point of the titration is more clearly visible; polyols are more quickly soluble.

The results of the individual determination methods differ from one another only in a manner not critical to the invention. Both can therefore be used.

Polymer ST 61 LV (supplier: Evonik) is a linear terminal lateral silane-modified polyurethane polyether copolymer that has been used in the mixture as a second, here longer-chain prepolymer. The Evonik Polymer ST 61 LV is a silane-terminated polyurethane which, with respect to its kinematic viscosity, represents an analog to the polymer of the company Wacker GENIOSIL® STP-E 10, which could be used alternatively in identical proportions without causing any significant differences in the resulting adhesive properties. GENIOSIL® STP-E10 is a dimethoxy(methyl) silyl—methylcarbamate-terminated polyether including two terminal dimethoxysilane groups, having an average molar mass of 8889 g/mol, having a polydispersity of approximately 1.6 and an amount of functional silyl groups E(t) of 0.225 milliequivalents based on one gram of the polymer. Its dynamic viscosity at 25° C.—measured according to DIN 51562—is 10 Pas. However—in contrast to the mentioned Wacker prepolymer type, which is an α-silane—the chemical constitution of the Evonik prepolymer type ST 61 LV corresponds from the bottom up to the γ-silanes. A comparable Wacker prepolymer that is a γ-silane but has a somewhat higher viscosity is GENIOSIL® STP-E15.

The reactive diluent—also called "booster"—Tegopac RD 1 (supplier: Evonik) is an ethoxy-silane terminal lateral silane-modified prepolymer that has been used in the mixture as a second, here shorter-chain prepolymer. The viscosity at 23° C. is 1 Pas. Tegopac RD1 has a chain length in the range of 4 K to 7 K, on average 5.5 K.

Of the liquid additives mentioned in Table 1, Dynasylan AMMO (supplier: Evonik) is a 3-aminopropyl trimethoxysilane that serves as crosslinker and adhesion promoter. With used amounts of 0.1%-2%, the use of the mentioned adhesion promoter exhibits adhesion-enhancing properties on various substrates, in particular also on lower-energy surfaces. The liquid additive Dynasylan VTMO (supplier: Evonik) is a vinyl trimethoxysilane that functions as a water scavenger for increasing the storage stability or for reaction control. The hydrolysis is thereby retarded so much that a crosslinking does not already occur prematurely during the mixing. The mixtures M1, M2 thus essentially represent one-component systems having sufficient storage stability.

In both formulas M1, M2, Dertophene H 150 from the company DRT has been used as resin, wherein it is a terpene-phenol resin having a softening point of 118° C. (determined according to the ring and ball method). However, other phenol-modified terpene resins, such as, for example, Dertophene T 105 from the same company, as well as hydrocarbon resins, rosin ester resins, acrylic resins, and their mixtures can also be used as suitable tackifying resins (tackifiers). C9/C5 hydrocarbons having an aliphatically modified C9 portion, for example, are also suitable as compatible resins, wherein the mixability is dependent on the content of C9, wherein C9 phenol resins are in principle suitable. Preferred resins are—as also suggested by the exemplary embodiments—terpene phenol resins from other manufacturers. Tree resins ("rosin resins") are also conditionally compatible with the prepolymers to be crosslinked, wherein here the compatibility depends on various factors, such as, for example, molecular weight and acid number.

In addition to the materials mentioned in Table 1, aging stabilizers or other additives, such as fillers, can be used without leaving the context of the invention.

As mentioned above, the formulas M1, M2—with the same quantitative composition—differ in the type of the catalysts used. In mixture 1 (M1), TIB-KAT® 216 from the company TIB Chemicals AG, i.e., dioctyltin laurate, was used as catalyst in a conventional amount of 1 phr (0.25 ma.-%). In two further comparison mixtures M1' and M1", in the sense of an even greater comparability the proportion of the catalyst has also been increased to 1.3 phr (0.33 ma.-%) in M1', and to 3.1 phr (0.75 ma.-%) in M1". In the mixture M1—measured in phr—and in the mixture M"—measured in ma.-%—it is thus respectively exactly as high as in M2.

The salts and esters of the lauric acid are called laurates. This acid having the systematic chemical name dodecanoic acid (chemical sum formula: $C_{12}H_{24}O_2$) is a saturated fatty acid and carboxylic acid. It is derived from the alkane n-dodecane. The name lauric acid comes from the laurel (latin: *Laurus nobilis*), whose fruits provide a fatty oil that contains primarily lauric acid.

Deuteron UV 1242 has been used as inventive catalyst K (see FIG. 1), which is offered by the company Deuteron GmbH as a UV photoinitiator for epoxides in their function as cationically polymerizing binding agent systems under UV exposure. Here the start of polymerization is initiated in a known manner—in contrast to the invention, wherein an exclusively thermal introduction of the activation energy is effected—by exposure with UV light in the wavelength range of 220-250 nm.

In terms of its appearance, Deuteron UV 1242 is a brownish, viscous liquid having a density of 1.1 g/cm³ and a flash point of over 100° C., wherein the active ingredient K is present in a concentration of 50 ma.-% in a benzene-free reactive diluent formed from C12/C14 glycid ether as solvent L (see FIG. 2). The glycid ether could also contain 8 to 18 carbon atoms in its molecule. The catalyst active ingredient K is a Lewis acid-base adduct made of a blocked—i.e., reaction-inhibited at least in the temperature range below 60° C.—Lewis acid and an antimonate, specifically the diphenyliodonium bis(dodecylphenyl)-iodoniumhexafluoro antimonate.

Here the organyl groups AG bound in the iodonium cation, which are in particular aryl groups and can be understood as protective groups, cause a blocking of the Lewis acid LS, wherein blocking can be understood to be a steric hindrance. As already explained—an inhibiting influence of the ion on the reaction process results from the property of steric hindrance. Thermodynamically a higher activation energy is thus required than for a reaction using a catalyst without the blocking. The activation energy and reaction kinetics of the crosslinking can be set via the chain length and chemical nature of the organyl groups AG, in particular via a suitable combination of aromatic and aliphatic group components. This is illustrated by FIG. 3, wherein different, in particular aliphatic, residues $R_1, R_2, R_3$, $R_4$ are connected to the phenyl structures of the Lewis acid LS. Here at least one of the residues $R_1$, $R_2$, $R_3$, $R_4$, or a plurality of residues R1, R2, R3, R4, can also be formed by hydrogen. The Lewis acid LS of the catalyst K according to FIGS. 1 and 2 can thus be regarded as a representative of the Lewis acid group LS described by FIG. 3.

FIG. 4 shows the Lewis structure in its upper part, and in its lower part the geometric configuration of the Lewis base LB $SbF_6^-$ of the catalyst K depicted in FIGS. 1 and 2. The Lewis base LB is the anion of a very strong inorganic acid, namely the already mentioned hexafluoroantimonic acid. The ion has an octahedral shape, wherein the antimony is located in the center as the central atom of the complex. In the atomic state antimony has five electron shells and five outer electrons. However, in the ion six binding electron pairs are associated with the antimony, wherein a π-bond of hybrid orbitals is present. The six fluorine atoms bound to the antimony in the hexafluoroantimonate ion as ligands each have a noble gas configuration that results by six respectively paired outer electrons, i.e., each three outer electron pairs and a binding electron pair each. Due to the electron excess the ion is simply negatively charged, wherein the charge density, with 48 possible electrons based on the ion radius, is extremely high. The hexafluoroantimonic acid thereby has the character of a superacid, or the hexafluoroantimonate has the character of a hard Lewis base LB according to the Pearson concept.

Figures 5, 6:
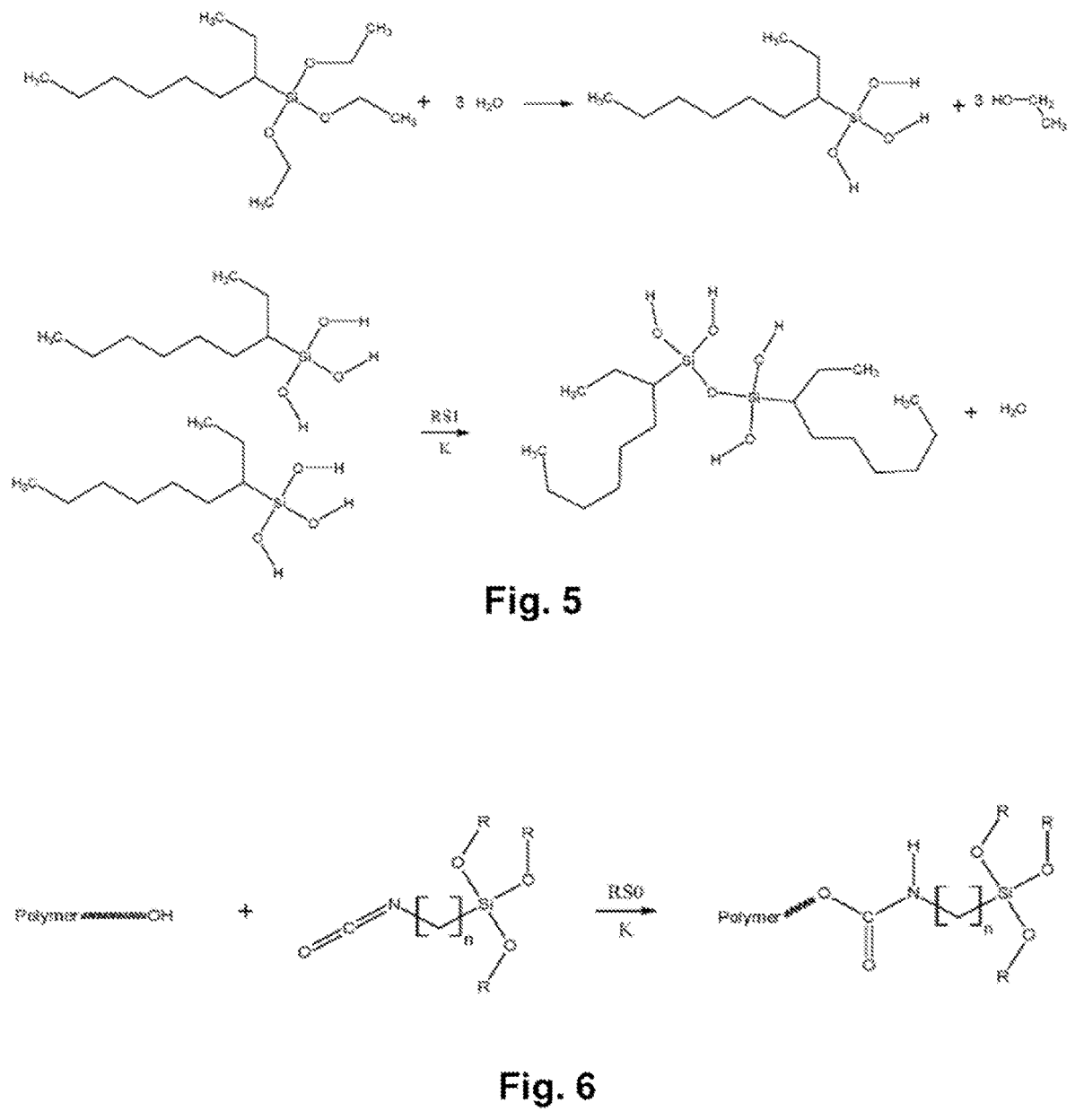

It can be seen from the two schematic chemical basic equations depicted in FIG. 5 that the inventive method is effected using the alkoxylated, in particular ethoxylated, silane-containing polymer in two reaction steps RS1, RS2. In the first reaction step (arrow RS1), under supplying of water from the alkoxylated, in particular ethoxylated, silane-containing polymer, an alkyl group, as depicted the ethyl group Et, is split off and converted to alcohol, in particular ethanol, wherein a hydrogen bond to the polymer residue is effected. Due to the inventive catalyst K here, a low hydrolysis speed of the ethanol residues according to the prior art is accelerated in comparison to methanol residues. As a result of the first reaction step RS1, hydroxyl groups are consequently bound to the silicon of the silane-containing polymer. For actual crosslinking in the narrower sense in the second reaction step (arrow RS2), a catalyzed (catalyst K)

polycondensation can thereby be effected, wherein the silicon atoms are connected to each other via oxygen bridges, and thus form crosslinked polysiloxanes. As concerns the polymer, the reaction steps RS1, RS2 can be effected in a one-component- or multi-component system.

In FIG. 6 a schematic basic chemical equation (arrow RS0) is depicted for running an optionally occurring prestep of the inventive method before the reactions depicted in FIG. 5. Here the formation of a urethane-(-OCON group)-containing alkoxylated (—OR-group-containing) silane-containing hybrid polymer is effected, like the terminal lateral silane-modified polyurethane polyether copolymer ST 61 LV, used in the examples and provided by Evonik company, and like the above-mentioned STP-E types of Wacker company.

Figure 7:
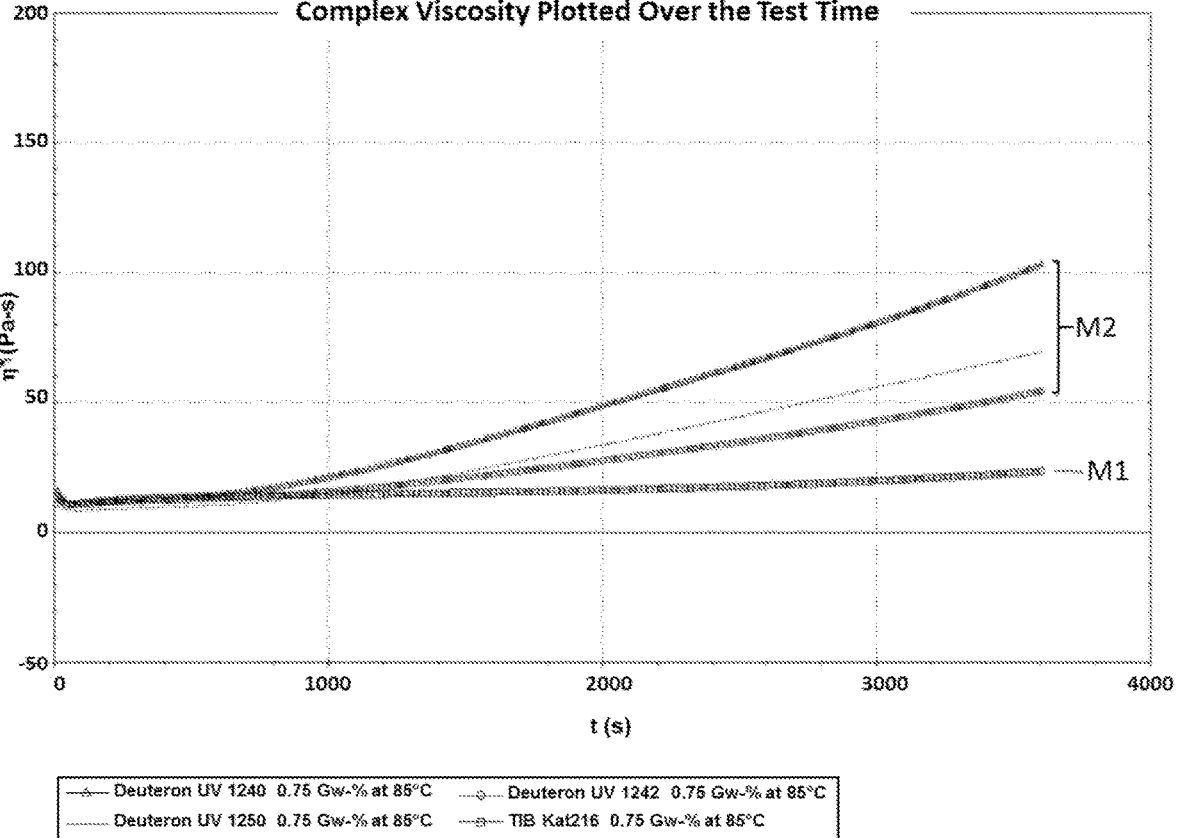
FIG. 7 shows a diagram representation of results of rheological measurements to indicate the increased crosslinking speed in the inventive method, compared to the prior art.

As already mentioned in the sense of an improved comparability—to prove the inventively achievable high speed of the crosslinking, rheological measurements were performed on the comparison mixtures M1 (catalyst content, however deviating from Table 1: 0.75 ma.-% in M1" and also in particular 20.00439 mole contents in the mixture in M1') and M2 (catalyst content, as in Table 1: 0.75 ma.-% equal to 0.00439 mole contents in the mixture) at 85° C., whose results are diagrammatically depicted in FIG. 7. Here the complex shear modulus G* or the complex viscosity η* is plotted in Pas against the measurement time t in seconds. Taking into account the stoichiometry and the different molar masses of conventional and inventively used catalysts, M1' and M2' are better comparable to each other than M1 and M2.

In comparison to other rheological measurements, one advantage of the measurement of these values using an oscillation rheometer consists in that for a possible determining of the elasticity, the two modulus components G' (storage modulus) and G" (loss modulus) of the complex modulus G* can be determined separately (compare DIN 53 019—1:2008-09 "Viscometry—Measurement of viscosities and flow curves by means of rotational viscometers—Part 1: Principles and measuring geometry" or DIN EN ISO 3219: 1994-10 "Plastics—Polymers/resins in the liquid state or as emulsions or dispersions—Determination of viscosity using a rotational viscometer with defined shear rate"), however in the context of the comparison experiments undertaken no use could be made thereof.

During the measuring using the oscillation rheometer, the measurement system performs vibrations and introduces a shear deformation into the sample, but without causing it to flow. The shear modulus G*, or the complex viscosity η* calculated therefrom and applied in FIG. 7 to the ordinate, then describes the behavior of the sample. Since the complex viscosity η* increases due to the thermally excited crosslinking, it represents a measure for the increasing degree of crosslinking. It can be seen that with the same initial viscosity of the two mixtures M1, M2, after one hour (3600 s) the inventive mixture M2 (Deuteron UV 1242) had more than twice as great a complex viscosity η* in comparison to the mixtures M1 including the tin catalyst (TiB Kat 216). Up to approximately 1200 s (20 min), the viscosity increase was only small (to approximately 14 Pas), and the difference between the two mixtures M1, M2 was negligible.

In two further exemplary embodiments, instead of the catalyst K Deuteron UV 1242, mentioned in Table 1, those with the trade names Deuteron UV 1240 and Deuteron UV 1250 have been used as inventive catalysts K. The mass proportions of the catalysts K in the formula were each identical to the proportion of Deuteron UV 1242 in Table 1

(0.75 ma-%). The mixture M2 has also been produced in the same way—i.e., as described above.

The catalysts K Deuteron UV 1240 and Deuteron UV 1250 are also offered by the company Deuteron GmbH as cationically polymerizing epoxydic binding agent systems as a function of UV photoinitiators. However, according to the invention such an activation with UV light did not occur. Therefore in the context of the invention, the use of UV-exposure systems can advantageously be completely omitted.

In terms of appearance, Deuteron UV 1240 is a reddish, viscous oil having a density in the range of 1.22 g/cm³ to 1.28 g/cm³ and a flash point of over 135° C., wherein the active ingredient K is present in a concentration of 50 ma.-% in a benzene-free solvent L comprised of propylene carbonate. The catalyst active ingredient K is a Lewis acid-base adduct made of a blocked Lewis acid and an antimonate, specifically the diphenyliodonium salt Bis(dodecylphenyl)-iodonium hexafluoro-antimonate.

In terms of appearance, Deuteron UV 1250 is a brownish viscous liquid having a density of 1.1 g/cm³ and a flash point of over 100° C., wherein the active ingredient K is present in a concentration of 50 ma.-% in a benzene-free reactive diluent, formed from C12/C14 glycid ether, as solvent L (see FIG. 2). The glycid ether could also contain 8 to 18 carbon atoms in its molecule. The catalyst active ingredient K is a Lewis acid-base adduct made of a blocked Lewis acid and an antimonate, specifically the diphenyliodonium salt Bis ((C10-C14)-alkylphenyl)-iodonium hexafluoro-antimonate.

It has also been shown here with the determining of the complex viscosity η*, which in turn increased due to the thermally excited crosslinking, (upper curves in FIG. 7) that with the same initial viscosity and initially similar small viscosity increase as with the comparison mixtures M1 (M1', M1''), after one hour (3600 s) the inventive mixtures M2 have very much greater complex viscosities η* (approximately 105 mPas with Deuteron UV 1240 and approximately 68 mPas with Deuteron UV 1250). The degree of crosslinking was thus even higher than with the use of Deuteron UV 1242 as catalyst K in the inventive mixture M2. Since Deuteron UV 1242 and Deuteron UV 1240 differ only with respect to the reactive diluent used as solvent L, the propylene carbonate of Deuteron UV 1242 appears more advantageous as solvent L than the C12/C14-glycid ether of Deuteron 1240. In the context of the present disclosure, the reactivity of the mixture can thus advantageously be controlled by a corresponding selection of catalyst.

The values or the curves of the comparison mixtures M1, M1' and M1'' showed no significant differences in the temporal pattern of the complex viscosity η*. It can be deduced from this that the nature of the catalyst has a much more significant influence on the crosslinking speed than the precise setting to a stoichiometrically "precision-fit" proportion.

From the mixtures M1, M2 described in Table 1, adhesive compositions have been manufactured by a common base mixture first being produced by a two-step method based on the positions according to Table 2. Here in a first step, the respective positions 1 and 2 have been brought to 175° C. under vacuum and homogenized under stirring. In a second step, a cooling to 100° C. has been effected, and thereafter an addition of the starting materials listed under position 3, with subsequent evacuation and under stirring for homogenization.

TABLE 2

| Positions in the manufacturing of the basic mixture | | |
|---|---|---|
| Function | Starting material | Position |
| Polymers | Tegopac Seal 100 | 2 |
| | Polymer ST 61 LV | 3 |
| Reactive diluent | Tegopac RD 1 | 2 |
| Liquid additives | Dynasylan AMMO | 3 |
| | Dynasylan VTMO | 3 |
| Resin | Dertophene H150 | 1 |

Then the manufacturing of the individual mixtures M1, M2 has been effected by the catalysts listed in Table 1 being added to each of the base mixtures and being homogenized at 100° C. under vacuum.

With the storing of such an inventively manufactured (one-component) adhesive in hobbocks with air-tight aluminum inliners, which have been made inert with nitrogen after filling with adhesive, even after over a month of storage no indications of a stronger crosslinking can be found, in comparison to the known tin catalyst. The storage stability is thus not significantly influenced. Even after twelve weeks, wherein the inventive product has been kept in a Hobbock (inliner closed with cable binder), it was not crosslinked after the opening of the container, but rather flowable.

The technically advantageous influence of the inventively used catalyst K of adhesive composition M2 has also been demonstrated after coating on a 50 μm thick polyethylene terephthalate film (PET film), as the following Table 3 shows. For this purpose the mixture for manufacturing the adhesive has been directly spread out using a chambered doctor blade as a uniform film onto the film, and subjected to a crosslinking (reaction according to FIG. 5 or also according to FIGS. 8 to 13) at a temperature in the range from 110° C. to 130° C. over a time period in the range of 4 min to 12 min.

In Table 3: "total" means the surface weight of the film and adhesive, "RT" means at room temperature, "PE" means on polyethylene, "PP" means on polypropylene. In the manner of the adhesive force measurement according to DIN EN 1939:2003-12 "Self-Adhesive Tapes—Determination Of Peel Adhesion Properties" an adhesive force measurement was carried out on polyethylene (PE) and polypropylene (PP)—after 10 minutes and 24 hours, respectively.

The determination of the shear strength has been effected according to DIN EN 1943:2003-01 "Self-adhesive—measurement of static shear adhesion."

It can be seen in Table 3 that with barely deviating specific surface weight the inventive (mixture M2) deviates only slightly from the values of the comparison mixture (mixture M1) in its values of the adhesive force on steel—that is, not impacting the required performance, while the values of the adhesive force on non-polar surfaces (PE, PP) according to the present disclosure are advantageously significantly higher. Here the shear strength remained unchanged.

TABLE 3

| Adhesive properties | | | |
|---|---|---|---|
| Test method | Unit | M1 Comparison | M2 Invention |
| Total surface weight | g/m² | 141.50 | 151.50 |
| Adhesive force steel immediate | N/cm | 16.21 | 11.00 |
| Adhesive force steel 10 min | N/cm | 18.05 | 10.79 |

19

TABLE 3-continued

Adhesive properties

| Test method | Unit | M1 Comparison | M2 Invention |
|---|---|---|---|
| Adhesive force steel 24 h | N/cm | 16.33 | 13.01 |
| Adhesive force PE 10 min | N/cm | 1.44 | 5.38 |
| Adhesive force PE 24 h | N/cm | 6.15 | 6.38 |
| Adhesive force PP 10 min | N/cm | 0.83 | 5.39 |
| Adhesive force PP 24 h | N/cm | 1.75 | 8.58 |
| Shear strength | | | |
| 625 mm², 1 kg | min | | |
| RT and 70° C. | | >10000 | >10000 |

The chemical equations reproduced in FIGS. 8 to 13 serve for a more detailed representation of the reactions referred to summarily in FIG. 5 with the arrow RS in the first partial step of the inventive method.

Figure 8:
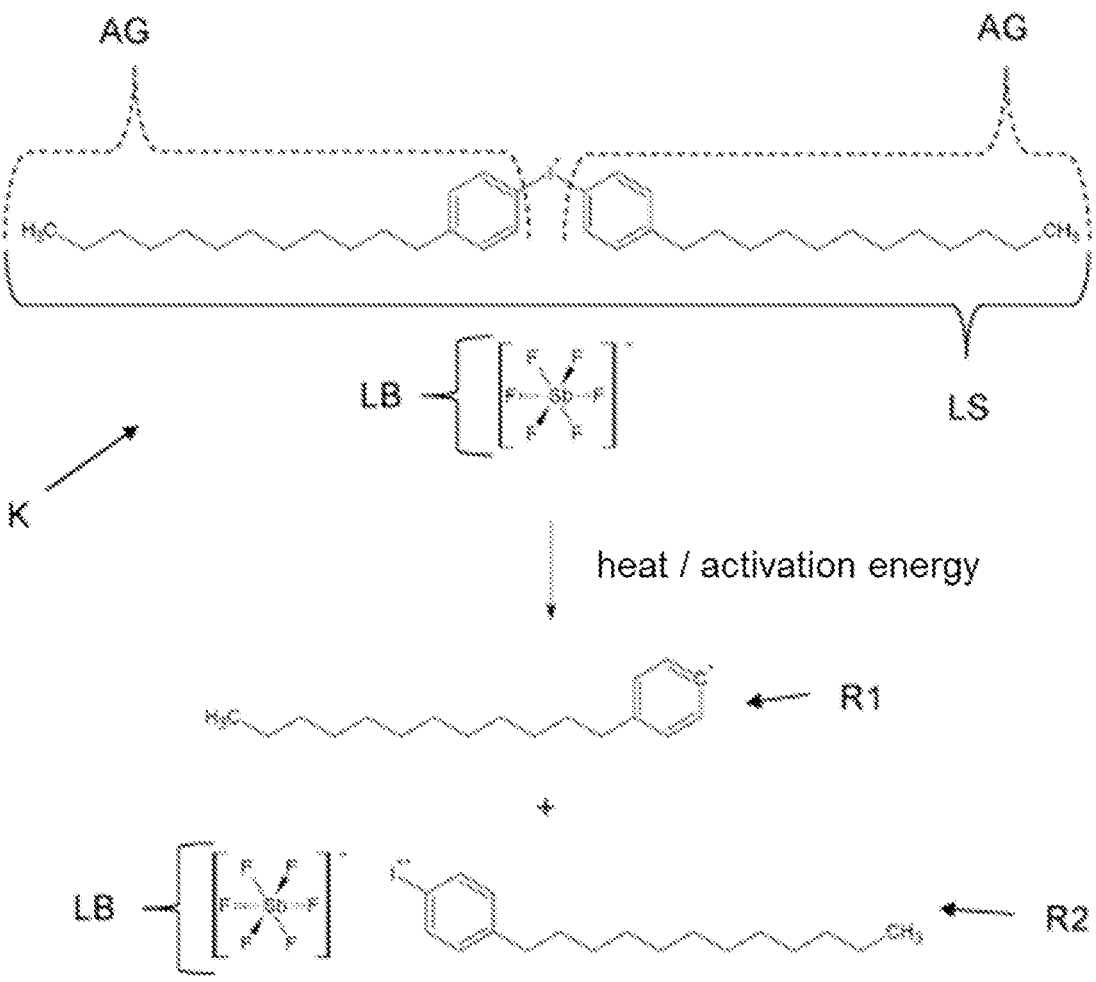
Figure 9:
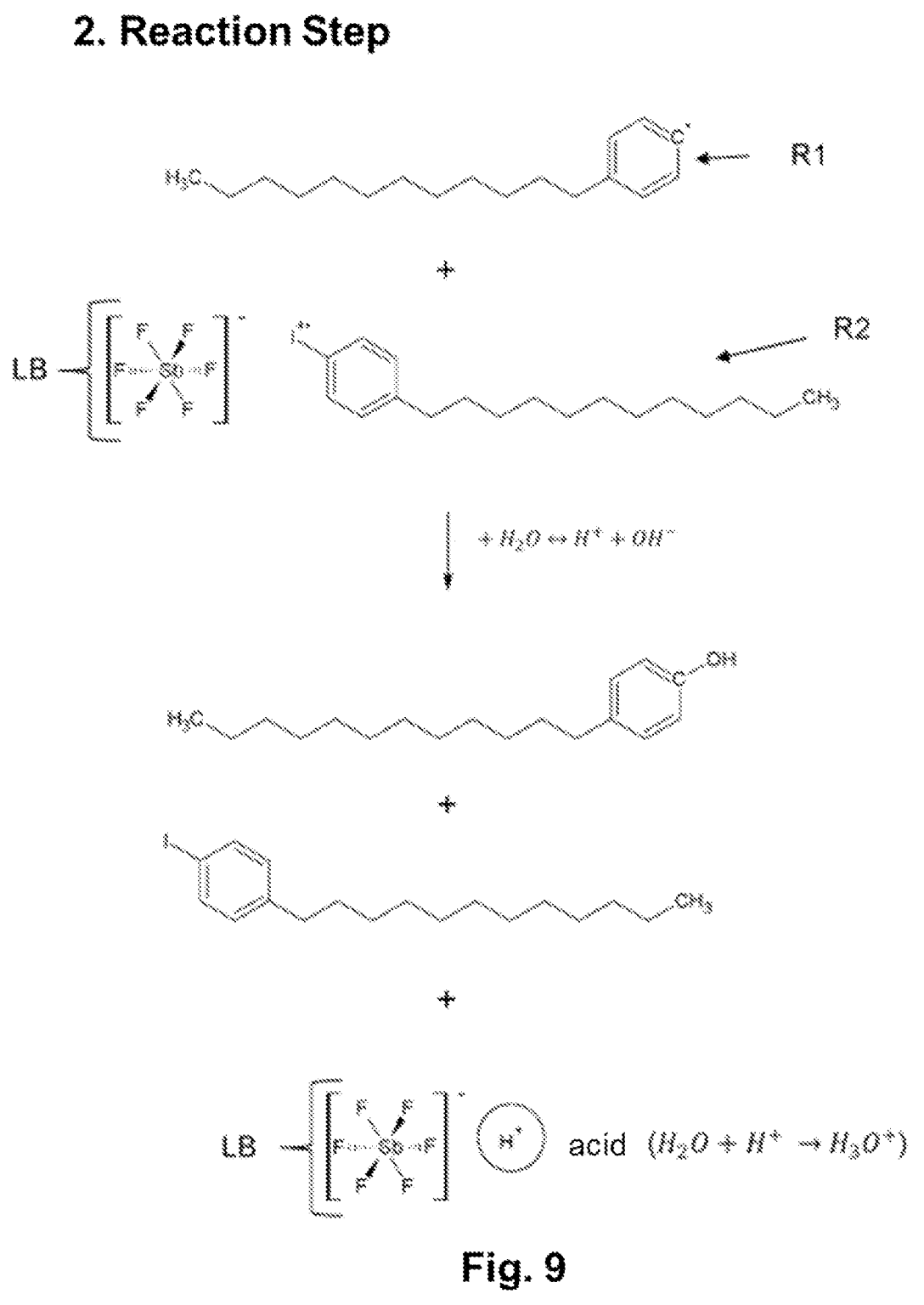

Here FIGS. 8 and 9 show the chemical equations of the reaction steps that occur with the activating of the catalyst K used in the inventive method. Here in the first reaction step depicted in FIG. 8, under the influence of the activation energy, in particular of heat, a splitting of the catalyst salt—by way of example a bis((C10-C14)-alkylphenyl)-iodinium-hexafluoro-antimonate is depicted as catalyzing Lewis acid-adduct—into two free radicals R1, R2 occurs. The first radical R1 is comprised of the one alkyl phenyl chain, and the second radial R2 is comprised of the other alkyl phenyl chain including the iodine as cation, and of the hexafluorantimonate as anion. In the second reaction step (FIG. 9), a water molecule is added whose OH group is stored on the first radial R1, wherein an electron migrates onto the iodine in the alkyl phenyl chain of the second radical R2 so that it becomes charge-neutral. Together with the hydrogen ion $H^+$ coming from the hydrogen molecule, the hexafluorantimonate complex forms the superacid hexafluoroantimonic acid with lowering of the pH value. Here hydronium ions $H_3O^+$ can be formed with additional water.

In the context of the present disclosure, protective groups, which are known to be considered exclusively as photolabile, are also or preferably exclusively used as thermally labile protective groups. In the example of Deuteron UV 1242 and of Deuteron 1240, they are the complete Bisdodecylphenyl-iodonium ion or—in the example of Deuteron UV 1250—the Bis((C10-C14)-alkylphenyl)iodinium ion, since prior to their thermal splitting these groups first initially protect the hexafluorantimonic acid from a release.

As can be seen from the chemical equations of the base reaction depicted in FIGS. 10 to 13, which four reaction steps show the hydrolytic decomposition of an alkylated silane-containing starting material—a trifunctional ethoxylated silane-containing compound that can already be present (not depicted) as a chain shaped polymer is shown as in FIG. 5, the reaction products stemming from the catalyst decomposition—i.e. both the acid residues of the hexafluoroantimonic acid (in the first reaction step of the hydrolysis, FIG. 10) and the hydronium ion (in the second reaction step of the hydrolysis, FIG. 11) are subsequently chemically active. In contrast to cationic polymerization, the acid residues of hexafluoroantimonic acid in the first reaction step of the hydrolysis indeed serve for forming a cation, but not for forming a carbocation, rather it accumulates on the silicon atom of the silicon group. In the second reaction step of the hydrolysis, the formed cation is protonated under splitting an ethoxy group and formation of ethanol. Ethoxy groups ("OEt") are also depicted in FIG. 5, but this reaction is also characteristic for other alkoxy groups, such as methoxy groups, wherein, however, the inventively used catalyst K preferably shows its particular efficiency precisely in the ethoxy groups.

Figures 12, 13:
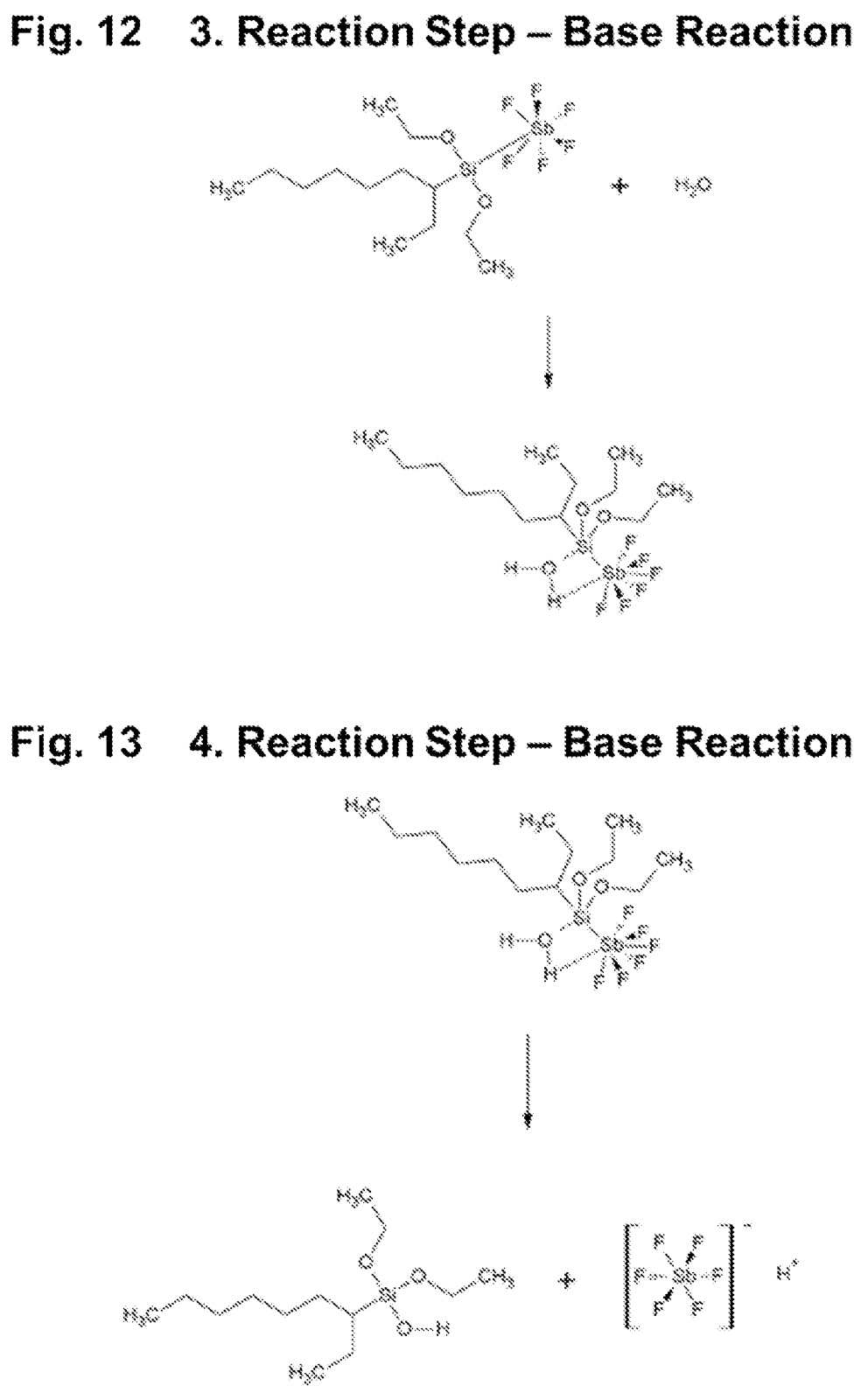

In the third reaction step (FIG. 12), accumulation of water onto the organic molecule occurs due to secondary binding forces, wherein the unstable intermediate product thus resulting then decomposes in the fourth reaction step (FIG. 13). In turn the hexafluoroantimonic acid comprised of the hexafluorantimonate complex and the hydrogen ion $H^+$ arises (compare FIG. 9), which is available for further catalysis, as well as a hydroxylated organic molecule that now carries a hydroxy group on the silicon atom instead of an ethoxy group. A network-forming polycondensation is thereby subsequently made possible as depicted in similar form on the left in FIG. 5 (arrow RS2).

Figure 15:
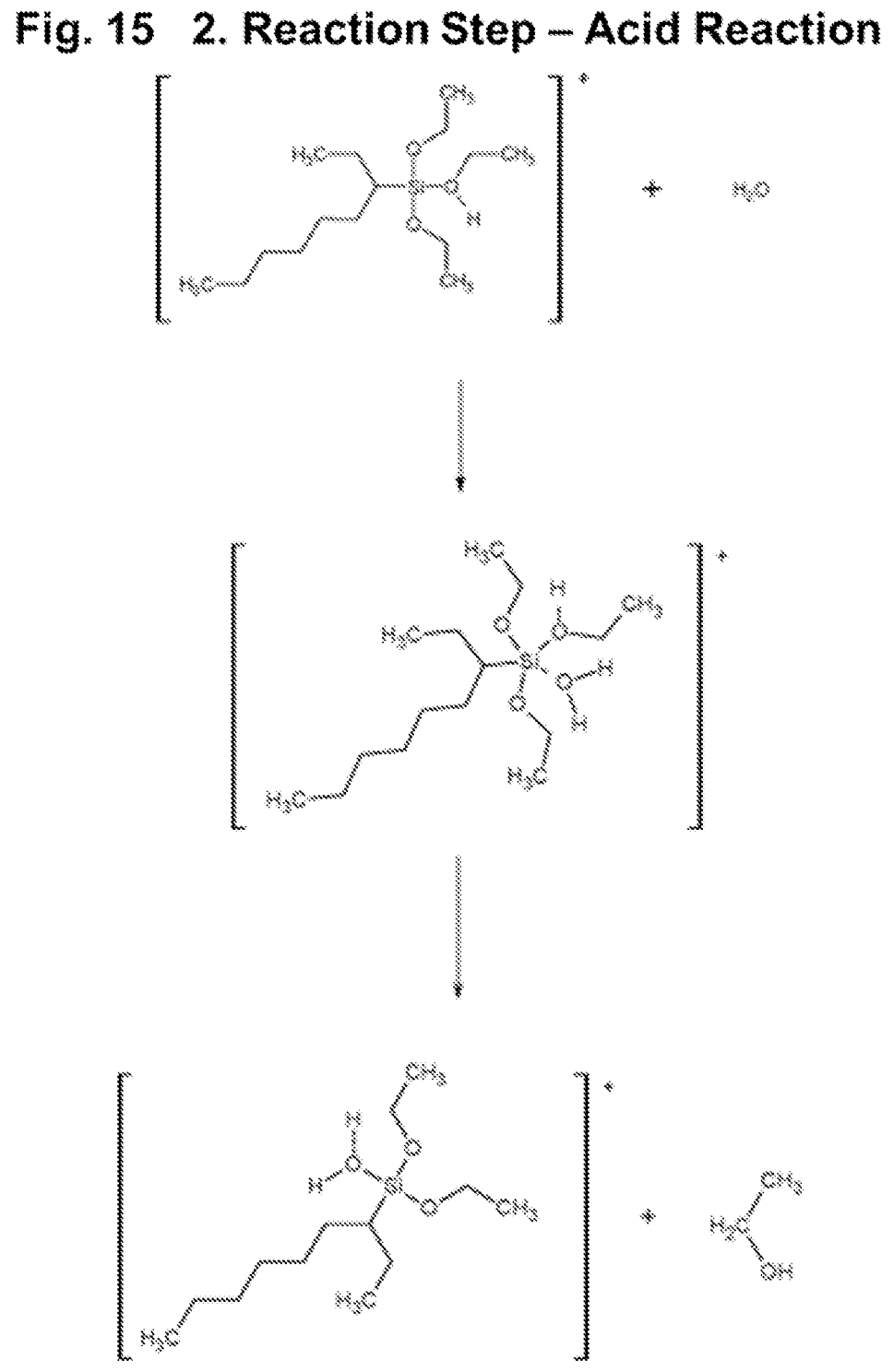
Figure 16:
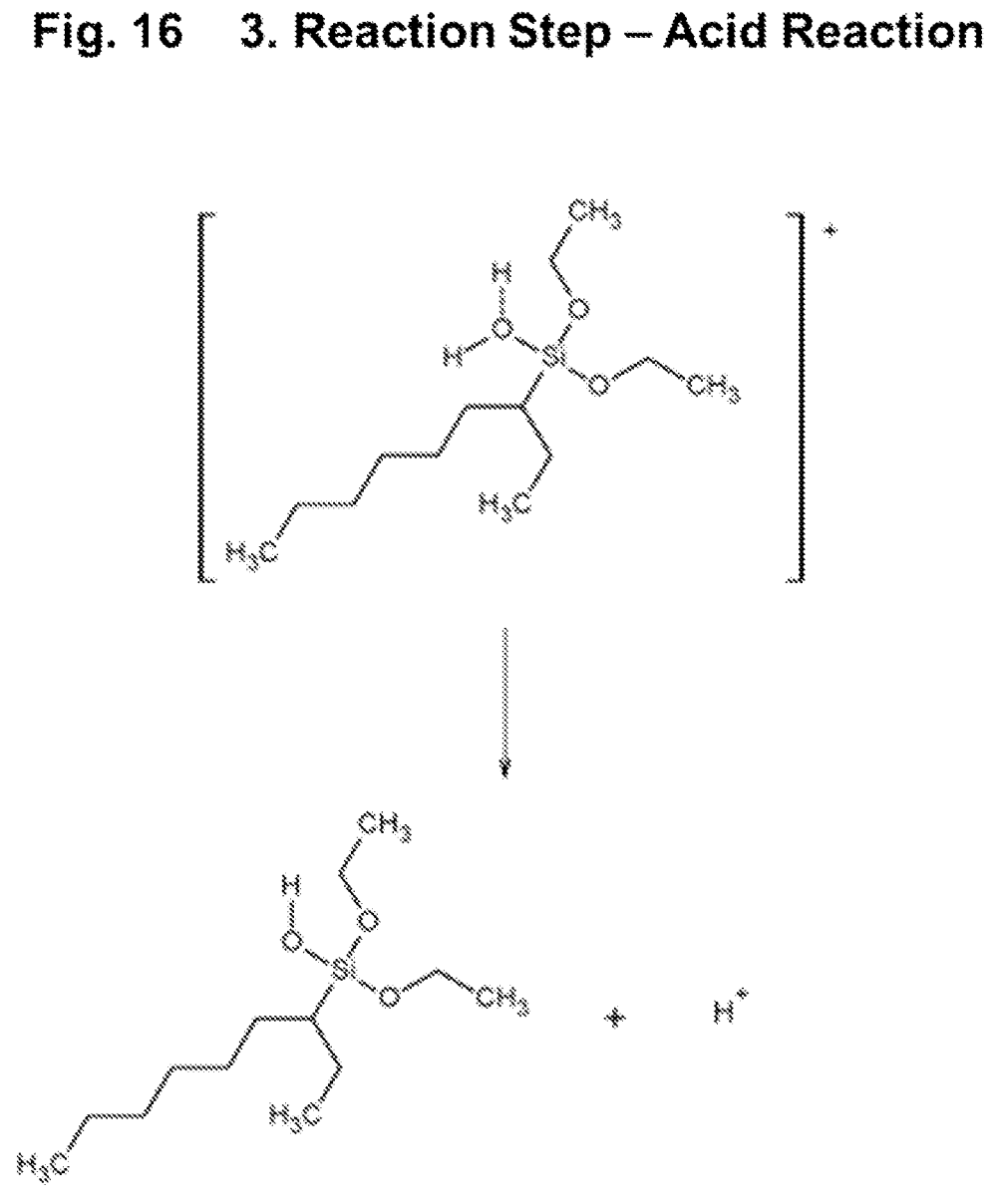

As can be seen from the chemical equations depicted in FIGS. 14 to 16, in addition to the base reaction described above, an acid reaction can also occur, whose three characteristic reaction steps are depicted starting from the same trifunctional ethoxylated silane-containing starting compound as according to FIGS. 10 to 13. As FIG. 16 shows, the same final product as according to FIG. 13 also arises due to the decomposition of the alkylated silane-containing starting material. The chemical equations are self-explanatory. As according to FIG. 11, ethanol also arises as a byproduct in the second reaction step.

In a further embodiment of the present disclosure explained below, by way of example an inventively preferred adhesive formula (mixture 4, reference number M4 in FIG. 17) is presented, which is distinguished in particular by the polymer from the mixture M2 and by the nature of the catalyst from the known formulas. The mixture 3 (reference number M3 in FIG. 17) is used as a known comparison formula, wherein the starting materials mentioned in the following Table 4 have been used as starting materials.

TABLE 4

Additional adhesive formulas (specifications in ma.-%)
Formulas (specifications in mass-percentage)

| Function | Starting material | M3 Comparison | M4 Invention |
|---|---|---|---|
| Polymer | Kaneka SAX 510 | 45.91 | 45.91 |
| Liquid additive | Dynasylan VTMO | 0.75 | 0.00 |
| Resin | Dertophene T115 | 52.59 | 52.59 |
| Catalysts | TIB-KAT ® 216 | 0.75 | 0.00 |
| | Deuteron UV 1242 | 0.00 | 1.50 |
| Total | | 100.00 | 100.00 |

Kaneka SAX 510 (supplier: Kaneka Corp.) is a terminal trimethoxy-silane MS-polymer (TMS-MS), which has been used as a single prepolymer in the mixtures M3 and M4. Kaneka SAX 510 is an unbranched prepolymer, wherein the three alkoxy-functional silane groups, in particular—in contrast to Tegopac Seal 100 in the mixtures M1, M2—methoxy groups, are connected terminally to a polyether framework of the polymer.

In both formulas M3, M4, Dertophene T 115 from the company DRT has been used as resin, wherein—as with Dertophen H 150—it is a terpene-phenol resin having a softening point of 120° C. (determined according to the ring and ball method). Dertophene T 115 differs from Dertophen H 150 by having a lower hydroxyl number, the significance and determination of which has already been discussed above. With Dertophene T 115, the hydroxyl number is 40-60, while the value for Dertophen H 150 is 145.

In the sense of a deeper understanding the same recipe is also specified again here in Table 4a in phr (parts per hundred rubber), wherein the normalized "100 parts rubber" is formed by the amount of the prepolymer (Kaneka SAX 510).

TABLE 4a

| Additional adhesive formulas (specifications in phr) Formulas (specifications in phr) | | | |
| --- | --- | --- | --- |
| Function | Starting material | M3 Comparison | M4 Invention |
| Polymer | Kaneka SAX 510 | 100.0 | 100.0 |
| Liquid additive | Dynasylan VTMO | 1.63 | 0.00 |
| Resin | Dertophene T 115 | 114.6 | 114.6 |
| Catalysts | TIB-KAT ® 216 | 1.63 | 0.00 |
| | Deuteron UV 1242 | 0.00 | 3.27 |
| Total | | 217.8 | 217.8 |

With the use of a methoxylated polymer in the formula—without a further polymer as a mixture component (proportion of the "first polymer" is equal to 100 percent, proportion of the "second polymer" is equal to zero)—this single polymer can preferably have a chain length in the range of more than 5 K, preferably in the range of 10 K to 36 K, on average 25 K, wherein 1 K of a change length corresponds to a molar mass of 1000 g/mol.

With a total proportion of silane-modified methoxylated prepolymers in the range of 50 ma.-%, up to 100 ma.-% in the mixture of the chain-shaped silane-modified alkoxysilane prepolymers, it can advantageously be provided that a thermal crosslinking is supported by UV irradiation.

Figure 17:
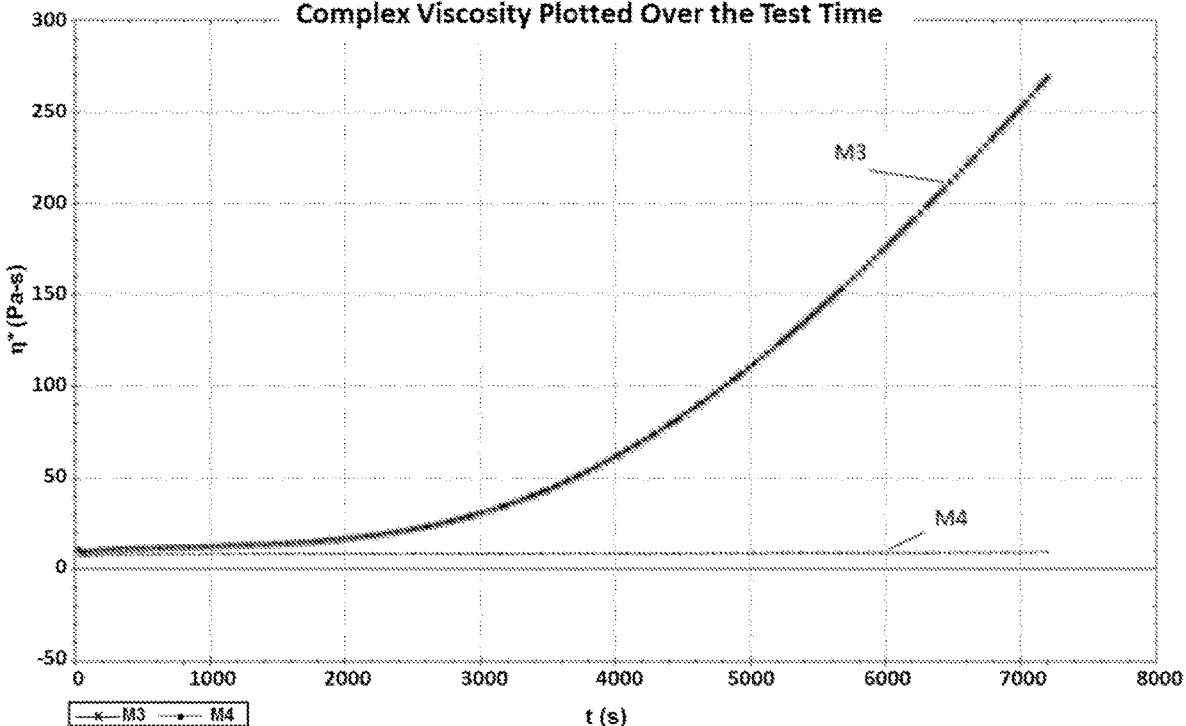
FIG. 17 shows a further diagrammatic representation of results of rheological measurements for indication of the increased crosslinking speed in the inventive method, compared to the prior art.

FIG. 17 shows the comparison of the temporal pattern of the complex viscosity $\eta^*$, which increases steadily due to crosslinking—thermally excited under the same conditions as with the measurements depicted in FIG. 7. However, in the inventive mixture M4 (lower curve in FIG. 17), the increase occurred to a much smaller degree than with the comparison mixture M3 (upper curve in FIG. 17). This indicates that with the chosen test temperature in the catalyst an inhibition was still present with respect to an initiation of the reactions to the hydrolysis of the methoxy groups and subsequent condensation, in particular with respect to the onset of the respective first reaction steps according to FIGS. 10 and 14. After approximately half an hour (1500 s), a significant divergence of the viscosity increase of the two mixtures M3 began, which was still not completed after two hours (7200 s). At this point in time the comparison mixture M3 has a complex viscosity $\eta^*$ of over 250 mPas, while with the inventive mixture M4 it is still approximately 20 mPas. It has been shown that on the one hand the inventive curve M4 can be increased as required by a higher temperature and/or an additional supporting of the crosslinking by UV irradiation, but that on the other had a slow reaction speed, in particular, a delayed hydrolysis and/or crosslinking speed, which the relatively low viscosity increase of the mixture M4 indicates; this is advantageous in particular in the cases wherein an encrusting of the coating head and/or a formation of inhomogeneities in the adhesive layer is to be effectively prevented. It is also to be noted here that the slowest respective reaction step has the greatest influence on the progression of the overall reaction. The inventive advantageous possibility of controlling of the reaction speed thus also comprises—in addition to the already mentioned catalyst selection itself—the matching of the mixture reactants to be crosslinked to an inventively used catalyst using its selective effectiveness with respect to various types of alkoxylated reaction partners.

The present disclosure is not limited to the feature combinations defined in the independent claims, but rather can also be defined by any other combination of certain features of all individual features disclosed overall. This means that in principle practically any individual feature of the independent claim can be removed or replaced by at least one individual feature disclosed elsewhere in the application. In this respect the claims should only be considered as a first attempt at formulating an invention. The numbers that relate to a certain formula component in each of the Tables 1/1a and 4/4a are to be regarded as respectively independent of the further formula components located in a similar column for the formula.

It is understood that—in contrast to the specifications in "parts per hundred rubber"—with a recipe specified in mass percent (ma.-%), the sum of all formula components is always 100.

The invention claimed is:

1. A method for manufacturing a pressure-sensitive self-adhering adhesive based on an alkoxylated, silane-containing polymer, the method comprising:

Mixing the alkoxylated, silane containing polymer, at least one tackifying resin compatible with the alkoxylated, silane-containing polymer and at least one catalyst to obtain a storable one-component system, the at least one catalyst comprising a Lewis acid-base adduct, activating the at least one catalyst; and using the at least one catalyst to crosslink the alkoxylated, silane-containing polymer, wherein the Lewis acid is a reaction-inhibited cation at temperatures up to but not including 60° C. in anhydrous medium, and the Lewis base is an anion of a very strong acid.

2. The method according to claim 1, characterized in that the Lewis acid-base adduct is a reaction-inhibited compound in the temperature range up to 80° C. in anhydrous medium, whereby the crosslinking is activated exclusively thermally at a temperature in the range from 85° C. to 180° C.

3. The method according to claim 1, characterized in that the Lewis acid is a sterically inhibited cation.

4. The method according to claim 1, characterized in that the cation is an organyl-group-containing halogen onium cation, whereby an activation energy and a reaction kinetics of the crosslinking is adjusted by the chain length and the chemical nature of the organyl group.

5. The method according to claim 1, characterized in that the very strong acid is at least one Brønstedt acid having a $pK_a$ value of $\leq-3.0$.

6. The method according to claim 1, characterized in that the Lewis acid-base adduct contains a di- or triphenyliodonium salt.

7. The method according to claim 1, characterized in that the Lewis acid-base adduct is dissolved in an anhydrous polar solvent.

8. The method according to claim 1, characterized in that the adhesive is manufactured from a mixture of chain-shaped silane-modified alkoxylated polymers, and the mixture contains at least one first, silane-modified ethoxylated prepolymer and at least one second silane-modified, ethoxylated and/or methoxylated prepolymer.

9. The method according to claim 8, characterized in that the first prepolymer is a longer prepolymer than the second prepolymer and a degree of polymerization of the second prepolymer is less than the degree of polymerization of the first prepolymer, wherein the degrees of polymerization differ by at least two powers of ten.

10. The method according to claim 9, characterized in that the first prepolymer or the second prepolymer or other additional prepolymers of the mixture are polyurethanes and or polyethers having one, two, or three groups of mono-, di- or trialkoxysilane-type.

11. The method according to claim 8, characterized in that a total proportion of silane-modified methoxylated prepolymers in the mixture of the chain-shaped silane-modified alkoxylated polymers is at most 50 mass percent (ma.-%).

12. The method according to claim 8, characterized in that the at least one tackifying resin is added to the mixture of chain-shaped, silane-modified alkoxylated polymers in a mass ratio of 1:4 to 4:1.

13. The method according to claim 9, characterized in that, if a total proportion of silane-modified methoxylated prepolymers in the mixture of the chain-shaped silane-modified alkoxylated polymers is in the range from 50 mass percent (ma.-%) to 100 ma.-%, a thermal crosslinking is supported by UV irradiation.

14. Method according to claim 1, characterized in that a mass proportion of the catalyst—related to the sum of the masses of the alkoxylated, silane-containing polymer—is in the range of 0.2% to 10.0%.

15. A pressure-sensitive self-adhering adhesive, manufactured according to the method of claim 1.

16. A method of using the pressure-sensitive self-adhering adhesive of claim 15 for manufacturing an adhesive product, the method comprising:

applying a non-crosslinked mixture of an alkoxylated, silane-containing polymer, at least one tackifying resin compatible with the alkoxylated, silane-containing polymer, and at least one catalyst on at least on one side of a carrier as a mixture in the form of an adhesive mass, and crosslinking the adhesive mass to form the pressure-sensitive self-adhering adhesive, using the at least one catalyst, which comprises a Lewis acid-base adduct, wherein the Lewis acid is a reaction-inhibited cation at temperatures up to but not including 60° C. in anhydrous medium, and the Lewis base is an anion of a very strong acid.

17. The method according to claim 1, characterized in that the alkoxylated, silane-containing polymer is an ethoxylated, silane-containing polymer.

18. The method according to claim 1, characterized in that in an oven, wherein the crosslinking takes place, no addition of water is performed.

19. The method according to claim 1, characterized in that the Lewis acid contains at least one protective group.

20. The method according to claim 4, characterized in that the organyl-group-containing halogen onium cation contains one or more aryl groups as organyl groups.

21. The method according to claim 1, characterized in that the Lewis base is an anion of a superacid, which has an $H_0$ value in accordance with the Hammett acidity function in the range from −14 to −30.

22. The method according to claim 6, characterized in that the Lewis acid-base adduct contains Bis(dodecylphenyl)-iodonium- or Bis((C10-C14)-alkylphenyl)-iodonium-hexafluoro-antimonate or -triflate.

23. The method according to claim 7, characterized in that the anhydrous polar solvent is a glycid ether or propylene carbonate.

24. The method according to claim 9, characterized in that the mass of the first silane-modified, ethoxylated prepolymer is less than 15 mass percent (ma.-%) of the total of the masses of prepolymers and the catalyst as well as possibly present resins and possibly further ingredients.

25. The method according to claim 9, characterized in that the first prepolymer or the second prepolymer or other additional prepolymers of the mixture contain as functional groups amino-, glycidoxy-, sulphuric-, and/or methacryloxy-groups in the molecule, which are bound in a γ-position via a propylene bridge or in an α-position via a methylene group to at least one silicon atom of the ethoxylated and/or methoxylated prepolymer.

26. The method according to claim 1, characterized in that the at least one tackifying resin is selected from the group phenol-modified terpene resins, hydrocarbon resins, rosin ester resins, acrylic resins and their mixtures.

* * * * *